(12) United States Patent
Ueno

(10) Patent No.: US 11,330,176 B2
(45) Date of Patent: May 10, 2022

(54) IMAGE CAPTURING APPARATUS THAT STARTS LIVE DISTRIBUTION AFTER A SET TIME ELAPSES FROM GIVING A DISRTIBUTION INSTRUCTION, AND CONTROL METHOD AND NON-TRANSITORY COMPUTER-READABLE STORAGE MEDIUM

(71) Applicant: CANON KABUSHIKI KAISHA, Tokyo (JP)

(72) Inventor: Daiyu Ueno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/739,483

(22) Filed: Jan. 10, 2020

(65) Prior Publication Data

US 2020/0228707 A1 Jul. 16, 2020

(30) Foreign Application Priority Data

Jan. 11, 2019 (JP) .............................. JP2019-003611

(51) Int. Cl.
*H04N 5/232* (2006.01)
*H04N 5/235* (2006.01)
*H04N 5/353* (2011.01)

(52) U.S. Cl.
CPC ....... *H04N 5/23245* (2013.01); *H04N 5/2353* (2013.01); *H04N 5/232933* (2018.08); *H04N 5/3535* (2013.01)

(58) Field of Classification Search
None
See application file for complete search history.

(56) References Cited

U.S. PATENT DOCUMENTS

| 9,807,308 B2 * | 10/2017 | Dietel | H04N 5/23216 |
| 10,506,289 B2 * | 12/2019 | Akumiah | H04N 21/4788 |
| 11,044,406 B2 * | 6/2021 | Ueno | H04N 5/232939 |
| 2003/0033384 A1 * | 2/2003 | Nishizawa | H04N 21/2187 |
| | | | 709/219 |

(Continued)

FOREIGN PATENT DOCUMENTS

| CN | 101808192 A | 8/2010 |
| CN | 103312967 A | 9/2013 |

(Continued)

OTHER PUBLICATIONS

Combined Search and Examination Report dated Aug. 11, 2020 in corresponding Great Britain patent appln. No. GB1918620.4.

(Continued)

*Primary Examiner* — Cynthia Segura
(74) *Attorney, Agent, or Firm* — Venable LLP

(57) ABSTRACT

This invention provides an image capturing apparatus comprising an image capturing unit, and a communication unit for communicating with a distribution server via internet, wherein the image capturing apparatus comprises a time measuring unit for measuring, if a distribution instruction for live distribution using the distribution server has been given, an elapsed time since the instruction has been given; and a control unit for starting, if the elapsed time measured by the time measuring unit has reached a predetermined set time, distributing an image captured by the image capturing unit to the distribution server via the communication unit.

18 Claims, 20 Drawing Sheets

(56) References Cited

U.S. PATENT DOCUMENTS

| | | | |
|---|---|---|---|
| 2015/0054965 A1 | 2/2015 | Sudo | |
| 2015/0135248 A1* | 5/2015 | Idaka | H04N 21/21815 |
| | | | 725/115 |
| 2015/0181135 A1 | 6/2015 | Shimosato | |
| 2015/0244758 A1* | 8/2015 | Kolowich | H04N 21/4223 |
| | | | 709/231 |
| 2016/0014322 A1 | 1/2016 | Kimura | |
| 2016/0191588 A1* | 6/2016 | Shafer | H04L 65/4084 |
| | | | 709/219 |
| 2016/0277802 A1* | 9/2016 | Bernstein | H04N 21/431 |
| 2017/0064360 A1 | 3/2017 | Houston | |
| 2017/0064362 A1* | 3/2017 | Jabara | H04N 21/25883 |
| 2017/0064366 A1* | 3/2017 | Jabara | H04N 21/2743 |
| 2017/0180780 A1* | 6/2017 | Jeffries | H04N 21/4307 |
| 2018/0160043 A1 | 6/2018 | Midorikawa | |
| 2018/0227632 A1* | 8/2018 | Rubin | H04N 21/44222 |
| 2018/0310031 A1* | 10/2018 | Sarkar | G06Q 30/00 |
| 2019/0320211 A1* | 10/2019 | Chen | H04N 21/234309 |
| 2019/0356792 A1* | 11/2019 | Kuwabara | H04N 5/772 |
| 2020/0162796 A1* | 5/2020 | Azuolas | H04N 21/23439 |
| 2021/0127070 A1* | 4/2021 | Hada | H04N 7/183 |

FOREIGN PATENT DOCUMENTS

| | | |
|---|---|---|
| CN | 105531623 A | 4/2016 |
| CN | 105611119 A | 5/2016 |
| CN | 206212124 U | 5/2017 |
| JP | 2017-191512 A | 10/2017 |
| JP | 2018-129802 A | 8/2018 |

OTHER PUBLICATIONS

Chinese Office Action dated Mar. 3, 2021 in corresponding Chinese Patent Appln. No. 202010004554.4.

Chinese Office Action dated Oct. 8, 2021 in corresponding Chinese Patent Appln. No. 202010004554.4.

Chinese Office Action dated Feb. 15, 2022 in corresponding Chinese Patent Appln. No. 202010004554.4.

* cited by examiner

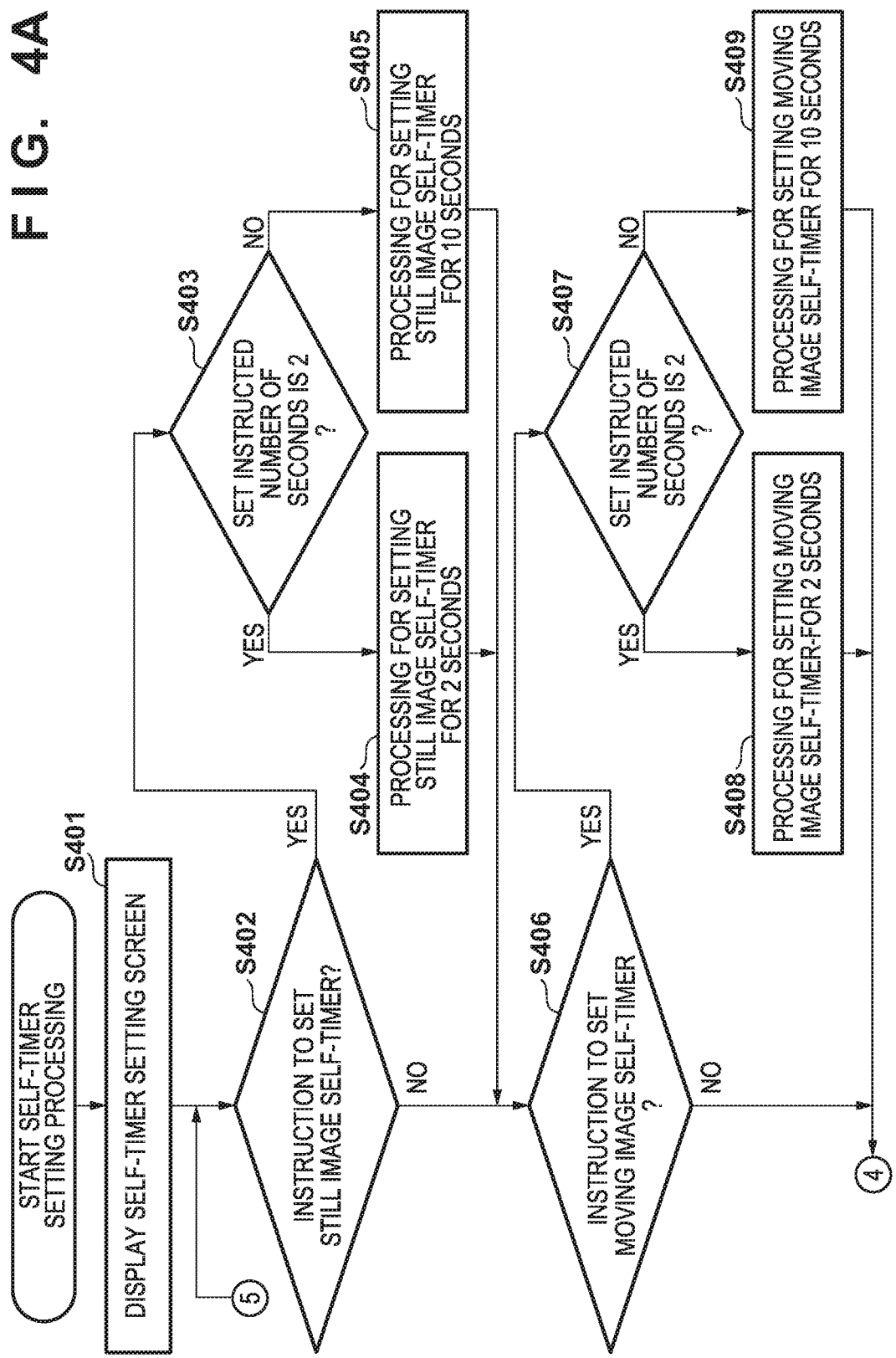

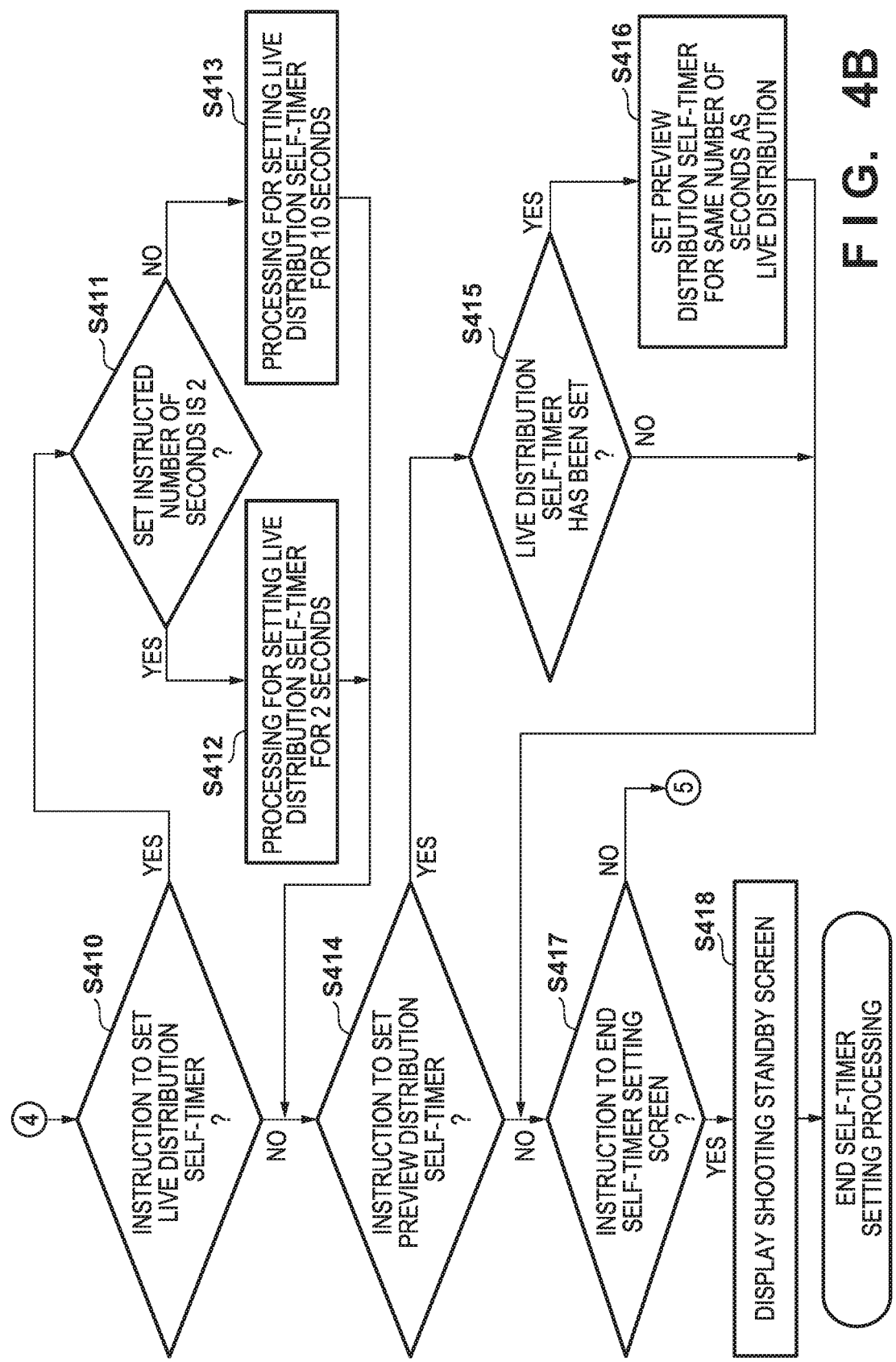

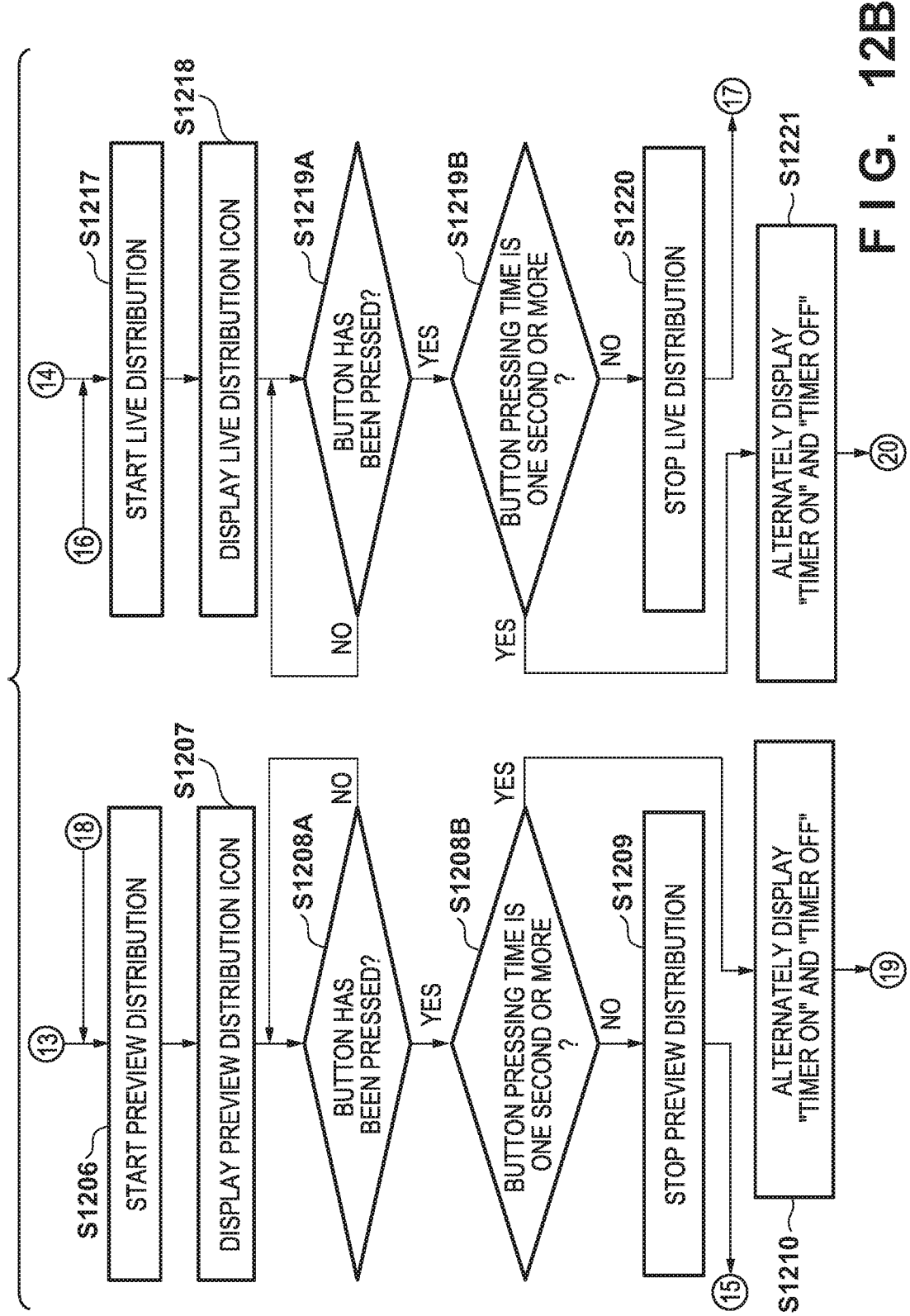

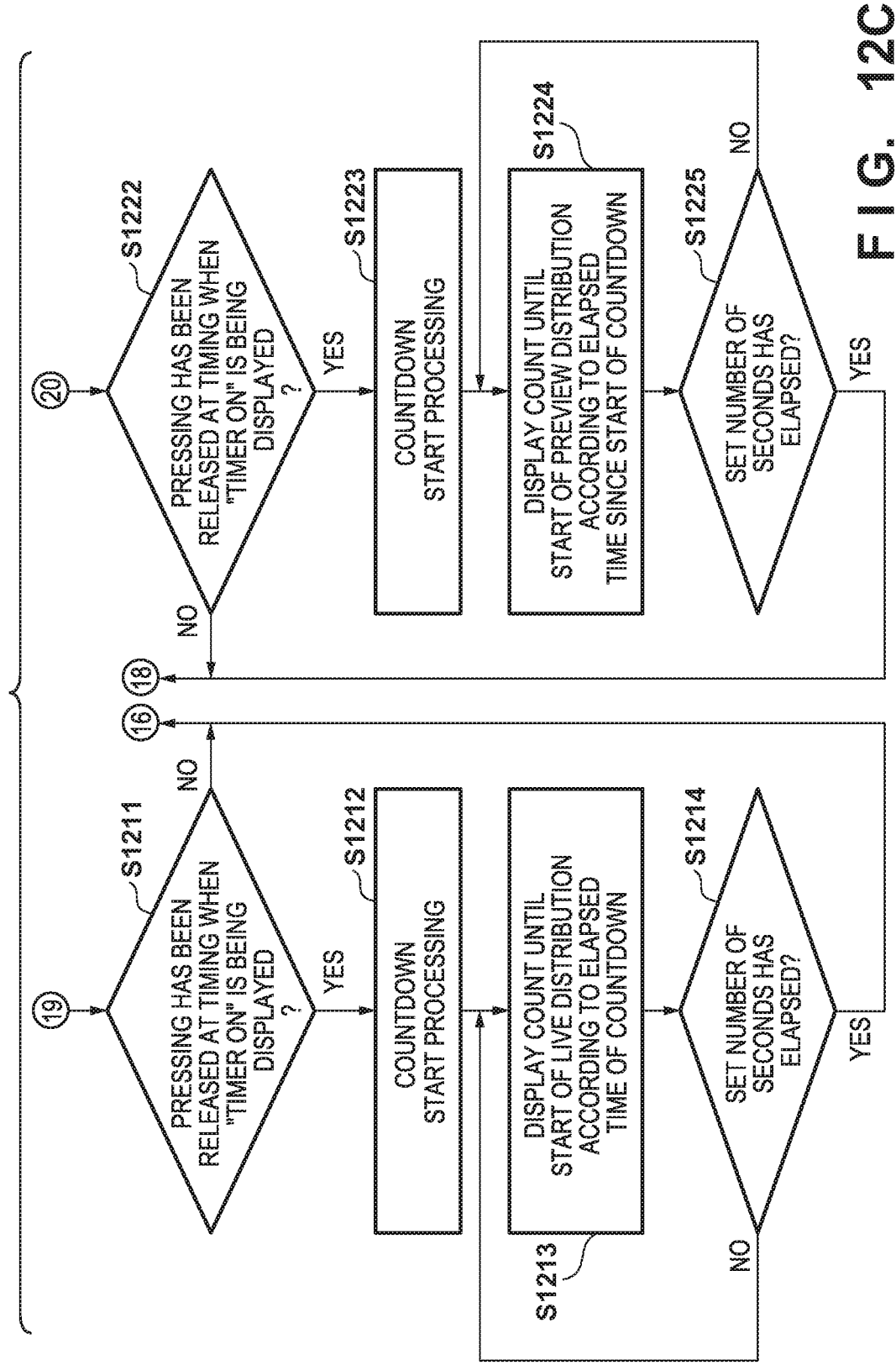

IMAGE CAPTURING APPARATUS THAT STARTS LIVE DISTRIBUTION AFTER A SET TIME ELAPSES FROM GIVING A DISRTIBUTION INSTRUCTION, AND CONTROL METHOD AND NON-TRANSITORY COMPUTER-READABLE STORAGE MEDIUM

BACKGROUND OF THE INVENTION

Field of the Invention

The present invention relates to an image capturing apparatus, and a control method, and a non-transitory computer-readable storage medium.

Description of the Related Art

In recent years, moving image distribution services via the Internet have been increasing, and it has become common for an individual to distribute a live video. In particular, many self-shot live videos are distributed by individuals operating a control on the user side of an imaging device. Regarding such live video distribution, the document: Japanese Patent Laid-Open No. 2018-129802 proposes a method in which a live video is distributed in real-time while adding effects for decorating the live video.

However, in the conventional technique proposed in the above-described document, a reference is made to a method for distributing a live video, but no reference is made to a method for preventing an inadvertent appearance of a hand with which a control such as a "distribution start member" is operated. Furthermore, if distribution is started soon after operating the distribution start member, the time to finish preparation for the start of distribution after the member has been operated cannot be controlled, resulting in a problem that a video that is not intended to be made publicly available may be distributed. This problem can be solved by deleting any unnecessary video by editing a moving image file in the case of shooting moving images that are to be recorded in the apparatus of the user; however, the images have already been made publicly available to third parties due to the live video distribution, and also cannot be edited afterward.

SUMMARY OF THE INVENTION

The present invention has been made in view of such a problem, and it is an object thereof to provide a technique for reducing the possibility of distributing any unnecessary video when starting live distribution.

According to an aspect of the invention, there is provided an image capturing apparatus comprising image capturing unit, and communication unit arranged to communicate with a distribution server via the internet, wherein the image capturing apparatus comprises: a time measuring unit configured to measure, if a distribution instruction for live distribution using the distribution server has been given, an elapsed time since the distribution instruction has been given; and a control unit configured to start, if the elapsed time measured by the time measuring unit has reached a set time, distributing an image captured by the image capturing unit to the distribution server via the communication unit.

According to a second aspect of the invention, there is provided a control method of an image capturing apparatus including image capturing unit, and communication unit arranged to communicate with a distribution server via the internet, the method comprising: measuring, if a distribution instruction for live distribution using the distribution server has been given, an elapsed time since the distribution instruction has been given; and controlling to start, if the elapsed time measured by the time measuring processing has reached a predetermined set time, distributing an image captured by the image capturing unit to the distribution server via the communication unit.

According to a third aspect of the invention, there is provided a computer-readable storage medium storing program which, when read and executed by a computer, causes the computer to perform the steps of a control method of an image capturing apparatus including image capturing unit, and communication unit for communicating with a distribution server via internet, the method comprising: measuring, if a distribution instruction for live distribution using the distribution server has been given, an elapsed time since the distribution instruction has been given; and controlling to start, if the elapsed time measured by the time measuring processing has reached a predetermined set time, distributing an image captured by the image capturing unit to the distribution server via the communication unit.

According to the present invention, it is possible to reduce the possibility of distributing any unnecessary video when starting live distribution.

Further features of the present invention will become apparent from the following description of exemplary embodiments (with reference to the attached drawings).

BRIEF DESCRIPTION OF THE DRAWINGS

FIGS. 4A and 4B are diagrams showing a flowchart of self-timer setting processing in the embodiment.

FIGS. 12A to 12C are diagrams showing a flowchart of main processing for switching between live distribution and preview distribution in the embodiment.

DESCRIPTION OF THE EMBODIMENTS

Figure 1A:
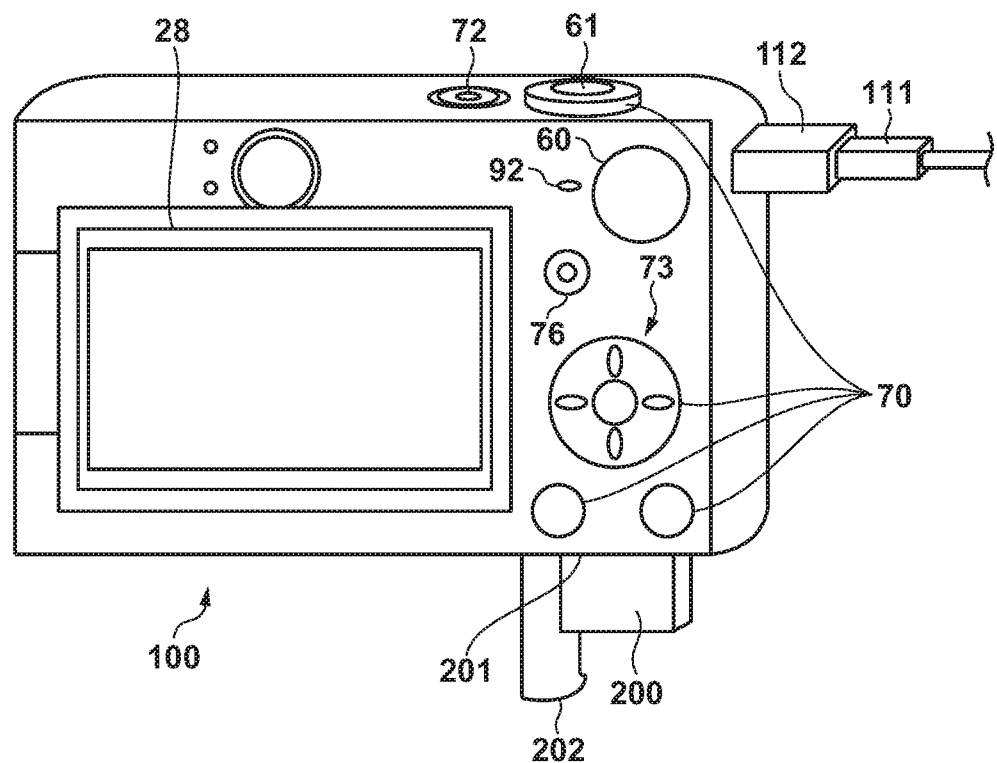
FIGS. 1A and 1B are external views of an image capturing apparatus according to an embodiment.

In the following, embodiments according to the present invention will be described in detail with reference to the accompanying drawings. It should be appreciated that the configurations in the following embodiments are merely illustrative, and the present invention is not limited to the configurations shown in the drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

Figure 1B:
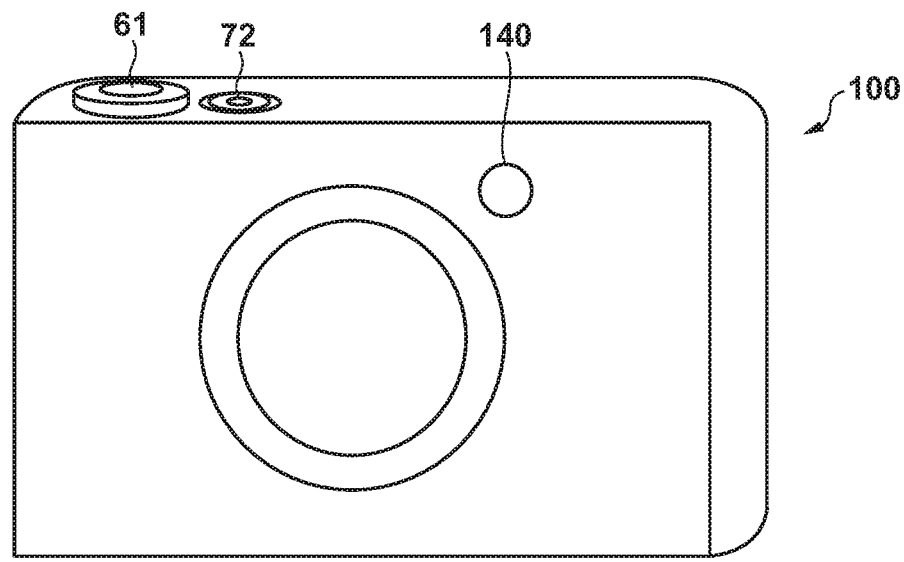

FIG. 1A is a rear perspective view of a digital camera 100 as an example of an image capturing apparatus to which an embodiment is applied, and FIG. 1B is a front perspective view of the digital camera 100.

A display unit 28 displays images and various types of information. In addition, the display unit 28 is of a variable angle type, and its display surface can be directed toward the subject (in the direction of the line of sight of a shooting lens of the digital camera). A shutter button 61 is an operation unit for providing a shooting instruction. A mode switching button 60 is an operation unit for switching between various modes. A connector 112 is a connector between the digital camera 100 and a connection cable 111 for establishing a connection with an external device such as a personal computer or a printer. An operation unit 70 is an operation unit composed of various operation members that receive various operations from the user, such as a switch, a button, and a touch panel. A controller wheel 73 is an operation member that is included in the operation unit 70 and that can be operated through rotation. A power switch 72 is a push button for switching between power-on and power-off. A recording medium 200 is a recording medium such as a memory card or a hard disk. A recording medium slot 201 is a slot for housing the recording medium 200. The recording medium 200 housed in the recording medium slot 201 is capable of communicating with the digital camera 100, and information can be recorded to and reproduced from the recording medium 200. A cover 202 is the cover of the recording medium slot 201. FIG. 1A shows a state in which the cover 202 is opened, and a portion of the recording medium 200 is taken out and exposed from the slot 201. A light-emitting unit 140 is formed by a light-emitting diode (LED) or the like, and notifies the subject located on the front side of the camera of an operating state (e.g., during countdown of a self-timer, start of shooting, etc.) of the digital camera 100, using a predetermined emission/non-emission pattern. The light-emitting unit 140 is disposed on the front surface of the camera (the subject side, the image capturing plane side) so as to be visible from the subject side. A moving image button 76 is used to provide an instruction to start or stop moving image shooting (recording). A speaker 92 notifies the subject of an operating state (e.g., during countdown of a self-timer, start of shooting, etc.) of the digital camera 100 by producing a buzzing sound or the like.

Figure 2:
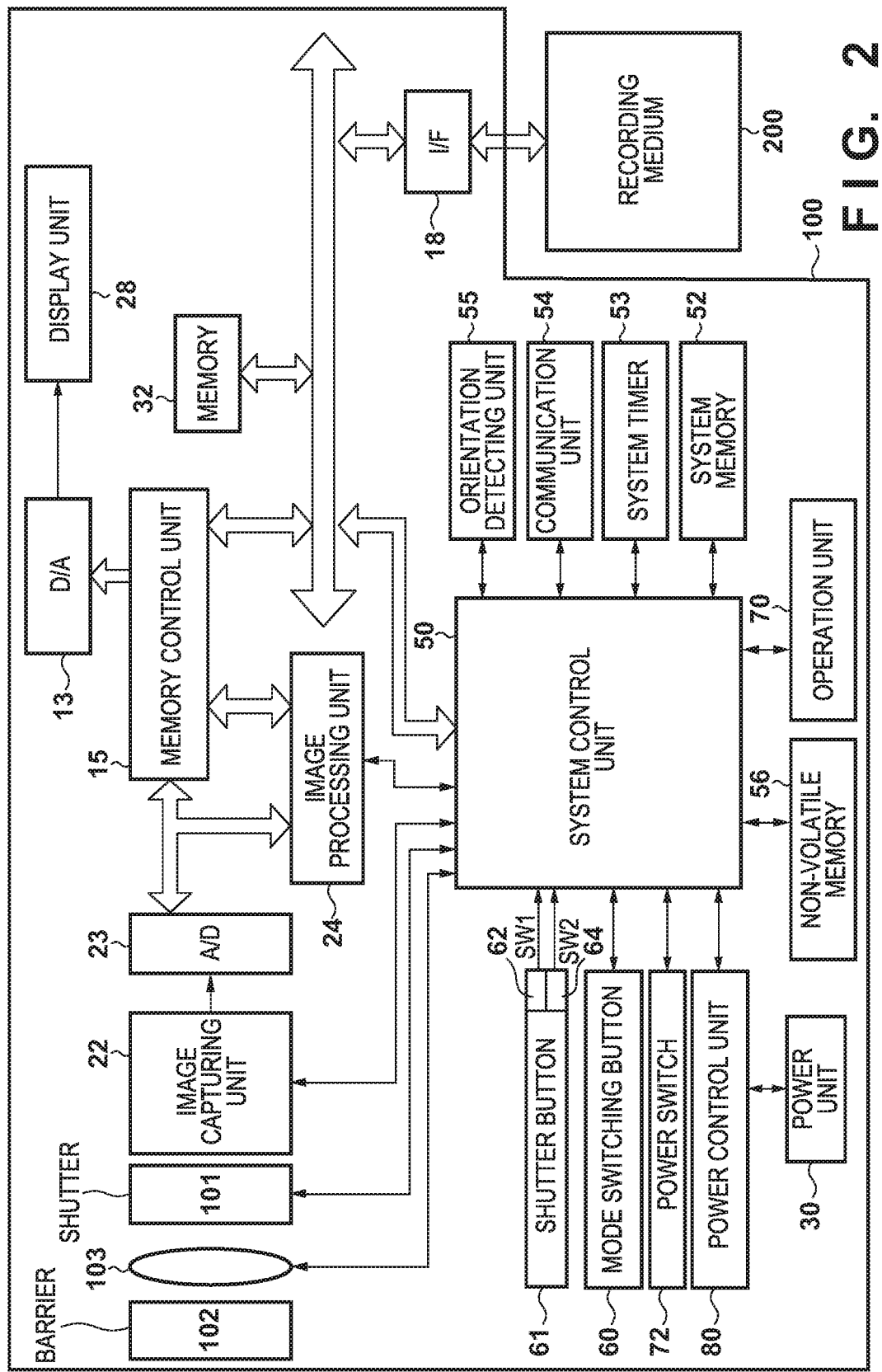
FIG. 2 is a block diagram showing a configuration of the image capturing apparatus of the embodiment.

FIG. 2 is a block diagram showing a configuration of the digital camera 100 according to the present embodiment. In FIG. 2, a shooting lens 103 is a lens group including a zoom lens and a focus lens. A shutter 101 is a shutter having an aperture function. An image capturing unit 22 is an image capturing element formed by, for example, a CCD or CMOS element that converts an optical image into an electric signal. An A/D converter 23 converts an analog signal into a digital signal. The A/D converter 23 is used to convert an analog signal that is output from the image capturing unit 22 into a digital signal. A barrier 102 covers an image-capturing system of the digital camera 100, including the shooting lens 103, thus preventing the image-capturing system including the shooting lens 103, the shutter 101, and the image capturing unit 22 from being stained or damaged.

An image processing unit 24 performs resizing processing such as predetermined pixel interpolation or reduction and color conversion processing for data from the A/D converter 23 or data from a memory control unit 15. In addition, the image processing unit 24 performs predetermined arithmetic processing using captured image data. A system control unit 50 performs exposure control and distance-measuring control based on the obtained results of the arithmetic processing performed by the image processing unit 24. Consequently, through-the-lens (TTL) auto focus (AF) processing, auto exposure (AE) processing, and pre-flash (EF) processing are performed. Furthermore, the image processing unit 24 performs predetermined arithmetic processing using captured image data, and performs TTL auto white balance (AWB) processing based on the obtained results of the arithmetic processing.

Output data from the A/D converter 23 is written via the image processing unit 24 and the memory control unit 15, or written directly to the memory 32 via the memory control unit 15. The memory 32 stores image data that has been obtained by the image capturing unit 22 and converted into digital data by the A/D converter 23, and image data for being displayed on the display unit 28. The memory 32 has a storage capacity that is sufficient to store a predetermined number of still images, and a moving image and audio of a predetermined time length.

The memory 32 also serves as an image display memory (video memory). A D/A converter 13 converts image display data that is stored in the memory 32 into an analog signal, and supplies the signal to the display unit 28. Thus, the display image data that has been written to the memory 32 is displayed by the display unit 28 via the D/A converter 13. The display unit 28 performs display on a display device such as an LCD in accordance with the analog signal from the D/A converter 13. Digital signals that have been once A/D converted by the A/D converter 23 and then accumulated in the memory 32 are converted into analog signals in the D/A converter 13, and the analog signals are successively transferred to the display unit 28 for display, thus allowing the display unit 28 to function as an electronic viewfinder and enabling through-image display (live-view display (LV display)) to be performed. Hereinafter, an image displayed in live view is referred to as "LV image".

A non-volatile memory 56 is a memory serving as an electrically erasable/recordable recording medium, and an EEPROM or the like may be used, for example. Constants, a program, and the like for operating the system control unit 50 are stored in the non-volatile memory 56. The program as used herein refers to a computer program for executing various flowcharts, which will be described later, in the present embodiment.

The system control unit 50 is a control unit including at least one processor or circuit, and controls the overall digital camera 100. The system control unit 50 implements various types of processing, which will be described later, in the present embodiment by executing the program recorded in the non-volatile memory 56 described above. As a system memory 52, a RAM may be used, for example. Constants and variables for operating the system control unit 50, the program read from the non-volatile memory 56, and so forth are loaded into the system memory 52. In addition, the system control unit 50 also performs display control by controlling the memory 32, the D/A converter 13, the display unit 28, and so forth.

A system timer 53 is a time measuring unit for measuring the times used for various controls, and the time of a built-in clock.

The mode switching button 60, the shutter button 61, and the operation unit 70 function as operation means for inputting various operation instructions into the system control unit 50. The mode switching button 60 switches the operating mode of the system control unit 50 to one of a still image recording mode, a moving image shooting mode, a live distribution mode, a preview distribution mode, a reproduction mode, and so forth. Examples of the modes that can be included in the still image recording mode include an automatic shooting mode, an automatic scene determination mode, a manual mode, an aperture priority mode (Av mode), a shutter speed priority mode (Tv mode), and a program AE mode. Other examples thereof include various scene modes having their respective shooting settings corresponding to the shooting scenes, a custom mode, and so forth. The mode switching button 60 allows the user to directly switch the mode to one of the above-described modes. Alternatively, the user may use the mode switching button 60 to perform switching to a shooting mode list screen temporarily, thereafter, select one of a plurality of modes displayed on the screen, and then perform switching to the selected mode using another operation member. Similarly, the moving image shooting mode may also include a plurality of modes.

The shutter button 61 includes a first shutter switch 62 and a second shutter switch 64 for detecting its pressing state. The first shutter switch 62 is turned on when the shutter button 61 provided on the digital camera 100 is being operated partway, so-called half-pressed (shooting preparation instruction), and a first shutter switch signal SW1 is generated. The system control unit 50 starts operations such as auto focus (AF) processing, auto exposure (AE) processing, auto white balance (AWB) processing, and pre-flash (EF) processing when triggered by the reception of the first shutter switch signal SW1. The second shutter switch 64 is turned on when the operation of the shutter button 61 is completed, so-called full-pressed (shooting instruction), and a second shutter switch signal SW2 is generated. The system control unit 50 starts operations of a series of shooting processing, from reading out of a signal from the image capturing unit 22 to writing of image data to the recording medium 200, when triggered by the reception of the second shutter switch signal SW2.

The operation members of the operation unit 70 have their respective functions assigned as appropriate thereto for each scene, for example, by selectively operating various function icons displayed on the display unit 28, and act as various function buttons. Examples of the function buttons include an end button, a return button, an image feed button, a jump button, a narrow-down button, and an attribute change button. For example, a menu screen through which various settings can be performed is displayed on the display unit 28 when a menu button is pressed. The user can intuitively perform various settings using the menu screen displayed on the display unit 28, a four-direction button for upward, downward, leftward and rightward directions, and a SET button.

The controller wheel 73 is an operation member that is included in the operation unit 70 and that can be operated through rotation, and is used together with the four-direction button when instructing a selected item. When the controller wheel 73 is operated through rotation, an electric pulse signal is generated according to the amount of the operation, and the system control unit 50 controls each of the various portions of the digital camera 100 based on the pulse signal. Based on the pulse signal, the angle at which the controller wheel 73 has been operated through rotation, and how many times the controller wheel 73 has been rotated can be determined. Note that the controller wheel 73 may be any operation member whose operation through rotation can be detected. For example, the controller wheel 73 may be a dial operation member, or more specifically, the controller wheel 73 itself may rotate in response to a user operation through rotation, thus generating a pulse signal. Alternatively, the controller wheel 73 may be an operation member formed by a touch sensor, and may detect, for example, a user's finger rotation action on the controller wheel 73 without the controller wheel 73 itself rotating (so-called, a touch wheel).

A power control unit 80 is composed of a battery detection circuit, a DC-DC converter, a switch circuit for switching a block to which a current is to be applied, and so forth, and detects the mounting of a battery, the type of the battery, and the remaining battery power. In addition, the power control unit 80 controls the DC-DC converter based on the result of detection and an instruction from the system control unit 50, and supplies a necessary voltage to various portions including the recording medium 200 for a necessary period. The power unit 30 is formed by a primary battery such as an alkaline battery or a lithium battery, a secondary battery such as a NiCd battery, a NiMH battery or a Li battery, an AC adapter, or the like.

A recording medium I/F 18 is an interface to the recording medium 200 such as a memory card or a hard disk. The recording medium 200 is a recording medium, such as a memory card, for recording a captured image, and is constituted by a semiconductor memory, an optical disc, a magnetic disk, or the like.

A communication unit 54 establishes a connection using a wireless or wired cable, and transmits and receives a video signal, an audio signal, and the like. The communication unit 54 can also establishes a connection with a wireless local area network (LAN) and the Internet. The communication unit 54 can transmit an image (including a through image) captured by the image capturing unit 22 and an image recorded in the recording medium 200, and also can receive image data and other various types of information from an external device.

An orientation detecting unit 55 detects the orientation of the digital camera 100 relative to the direction of gravity. Based on the orientation detected by the orientation detecting unit 55, the system control unit 50 can determine whether an image captured by the image capturing unit 22 is an image captured when the digital camera 100 is held horizontally or an image captured when the digital camera 100 is held vertically. The system control unit 50 can also add orientation information corresponding to the orientation detected by the orientation detecting unit 55 to an image file of an image captured by the image capturing unit 22, and rotate the image before being recorded. An acceleration sensor, a gyrosensor, or the like can be used as the orientation detecting unit 55. Using an acceleration sensor or a gyrosensor serving as the orientation detecting unit 55, it is also possible to detect motions (a pan, a tilt, a lift-up, whether or not being still, etc.) of the digital camera 100.

Figure 3A:
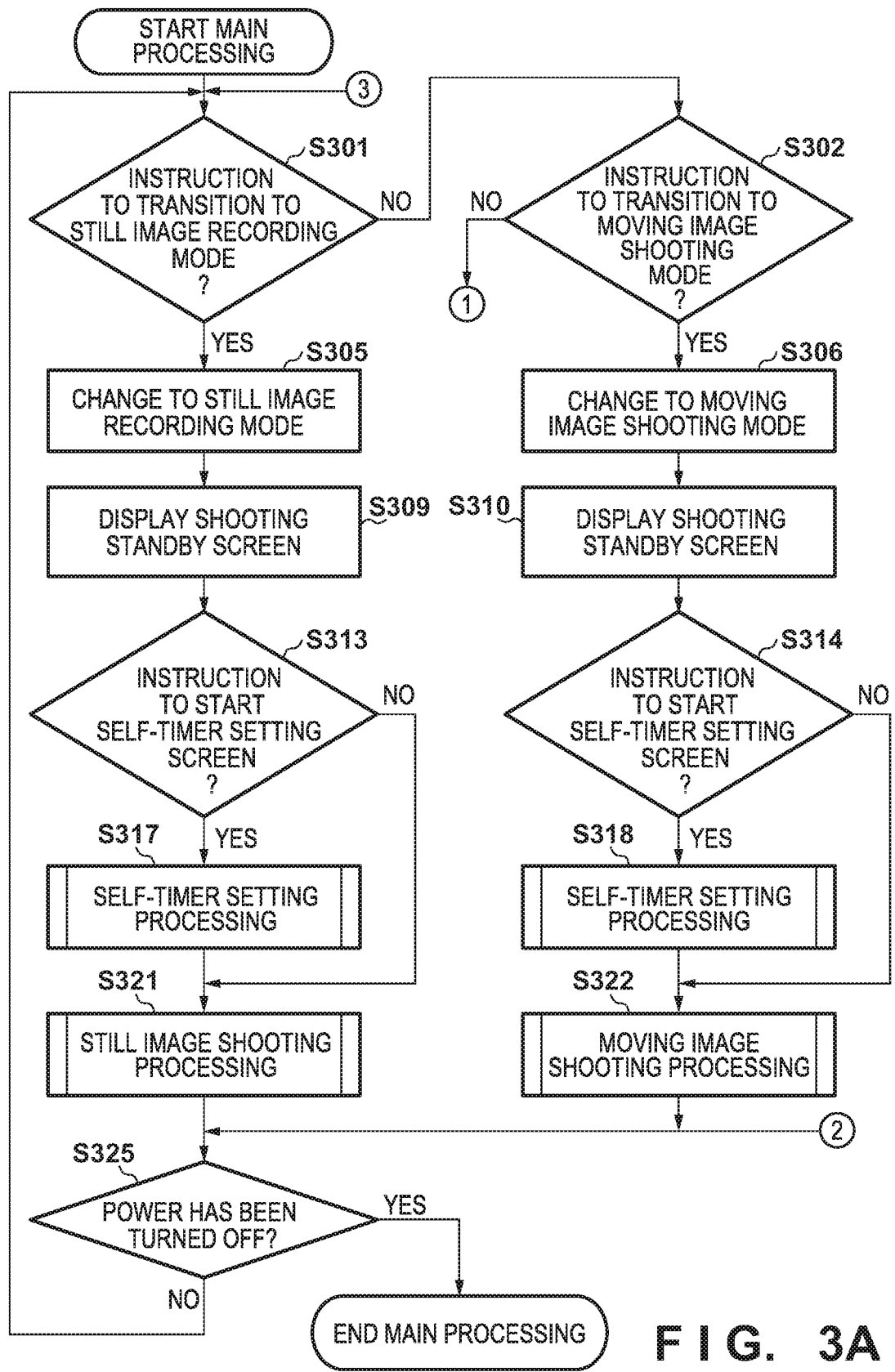
FIGS. 3A and 3B are diagrams showing a flowchart of main processing in the embodiment.
Figure 3B:
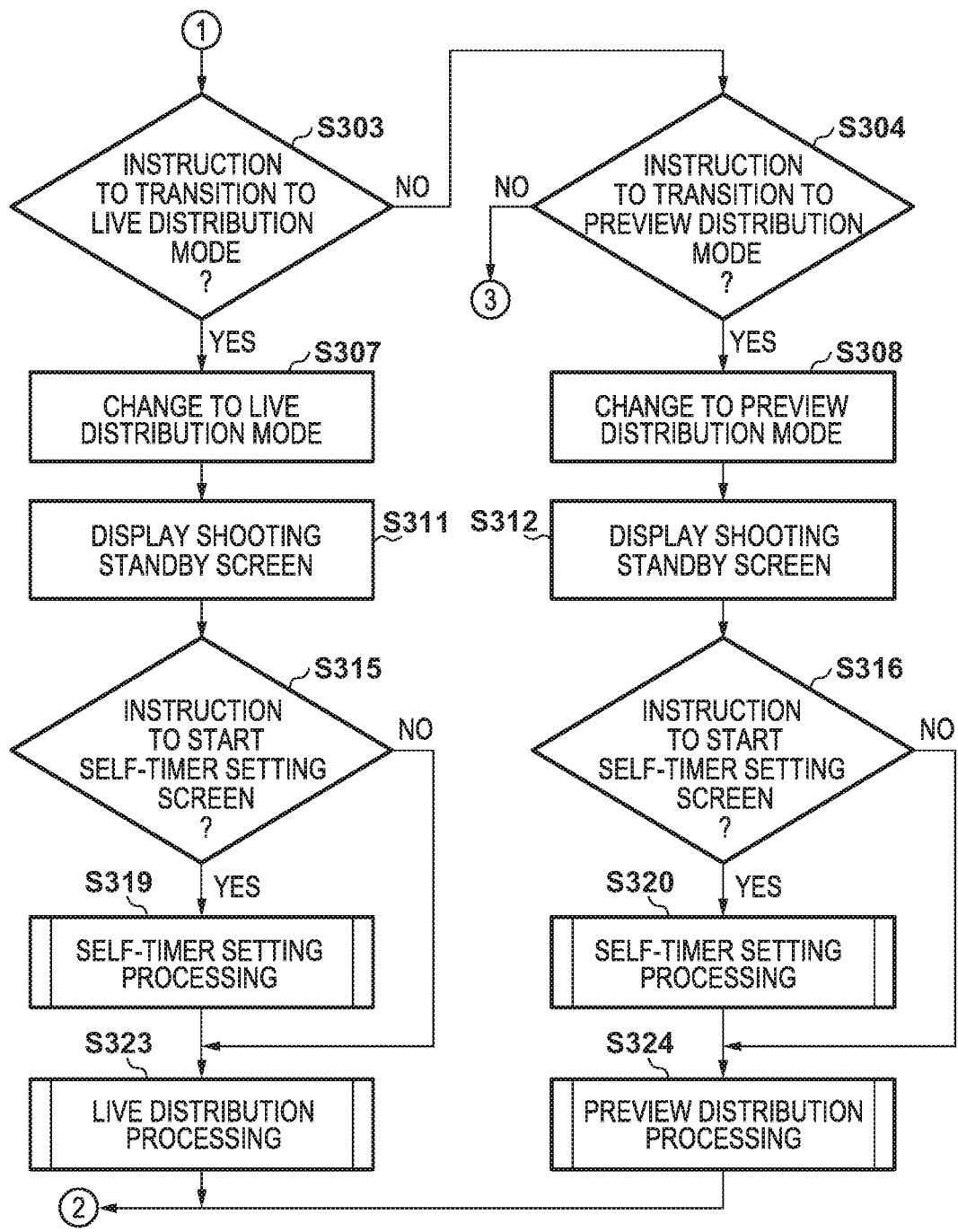

The flowcharts in FIGS. 3A and 3B show main processing including mode transitions. Each processing shown in FIGS. 3A and 3B is implemented by the system control unit 50 loading the program stored in the non-volatile memory 56 to the system memory 52 and executing the program, after the power switch 72 has been turned on.

In step S301, the system control unit 50 determines whether the user has given an instruction to transition to the still image recording mode, based on a signal from the mode switching button 60. If it is determined that an instruction to transition to the still image recording mode has been given by the user, the system control unit 50 advances the processing to step S305. If it is determined that an instruction to transition to the still image recording mode has not been given by the user, the system control unit 50 advances the processing to step S302.

In step S302, the system control unit 50 determines whether the user has given an instruction to transition to the moving image shooting mode, based on a signal from the mode switching button 60. If it is determined that an instruction to transition to the moving image shooting mode has been given by the user, the system control unit 50 advances the processing to step S306. If it is determined that an instruction to transition to the moving image shooting mode has not been given by the user, the system control unit 50 advances the processing to step S303.

In step S303, the system control unit 50 determines whether the user has given an instruction to transition to the live distribution mode (mode in which an image currently being captured is distributed), based on a signal from the mode switching button 60. If it is determined that an instruction to transition to the live distribution mode has been given by the user, the system control unit 50 advances the processing to step S307. If it is determined that an instruction to transition to the live distribution mode has not been given by the user, the system control unit 50 advances the processing to step S304. Note that the live distribution mode is a mode in which image data is distributed to another image communication apparatus in order to make the image data publicly available to a third party.

In step S304, the system control unit 50 determines whether the user has given an instruction to transition to the preview distribution mode, based on a signal from the mode switching button 60. If it is determined that an instruction to transition to the preview distribution mode has been given by the user, the system control unit 50 advances the processing to step S308. If it is determined that an instruction to transition to the preview distribution mode has not been given by the user, the system control unit 50 returns the processing to step S301. Note that the preview distribution mode is a mode in which image data is distributed to another image communication apparatus, and the image data can be confirmed only by the user without being made publicly available to a third party.

In either of the live distribution mode and the preview distribution mode, image data is transmitted to a distribution server on the Internet. However, a moving image is not made publicly available to a third party in the preview distribution mode, and is made publicly available to a large number of unspecified users in the live distribution mode. Making a moving image publicly available as used herein refers to making the moving image accessible to a large number of unspecified users to access without the need to input a key code such as a password. In the present embodiment, the account of a distribution user is registered in advance in a distribution server on the Internet, and a login is performed using the account of the distribution user. That is, a login is performed using an account ID and a password that have been registered in advance. In this state, a moving image transmitted in the preview distribution mode can be viewed. In the preview distribution mode, the distribution user can confirm how the moving image will be viewed from another user. In the live distribution mode, anyone who accesses the URL of an event that is being distributed live can view the moving image, without performing a login using the account of the distribution user.

Note that the distribution destination in the live distribution mode and the distribution destination in the preview distribution mode of the digital camera 100 in the embodiment may be separately set in advance by the user via the operation unit, and pieces of information that respectively specify the destinations may be held in the memory 32 or the like. In this case, the distribution destination in the preview distribution mode is, typically, an apparatus used by the user of the digital camera 100 or the subject in order to confirm a captured image, and may be, for example, a portable terminal such as a smartphone owned by the user. On the other hand, the live distribution mode is publicly available to a third party, and therefore the distribution destination thereof is a server on the Internet, for example.

In step S305, the system control unit 50 changes the camera state to the still image recording mode. In step S306, the system control unit 50 changes the camera state to the moving image shooting mode. In step S307, the system control unit 50 changes the camera state to the live distribution mode. In step S308, the system control unit 50 changes the camera state to the preview distribution mode. Note that the system control unit 50 stores and holds information indicating the changed mode in the system memory 52.

Figure 9A:
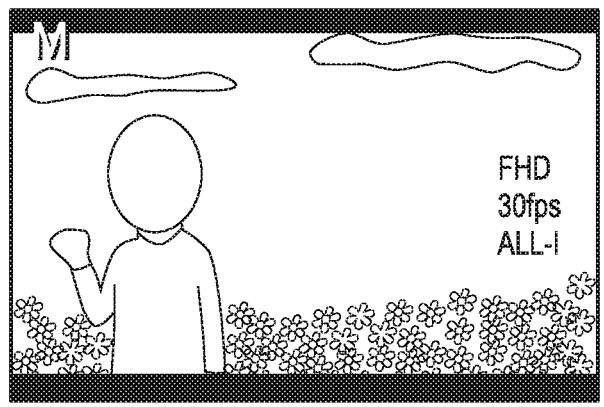
FIGS. 9A to 9D are diagrams showing respective shooting standby screens of a still image recording mode, a moving image shooting mode, a live distribution mode, and a preview distribution mode in the embodiment.

In step S309, the system control unit 50 displays, on the display unit 28, a screen indicating a shooting standby state in the still image recording mode. FIG. 9A shows an example of the screen for the shooting standby state in the still image recording mode displayed on the display unit 28 in the present embodiment.

Figure 9B:
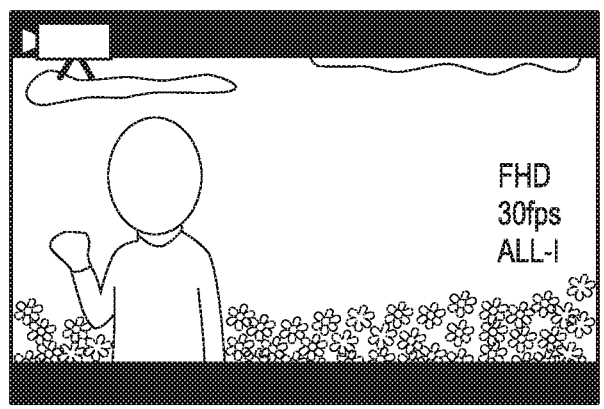

In step S310, the system control unit 50 displays, on the display unit 28, a screen indicating a shooting standby state in the moving image shooting mode. FIG. 9B shows an example of the screen for the shooting standby state in the moving image shooting mode displayed on the display unit 28 in the present embodiment.

Figure 9C:
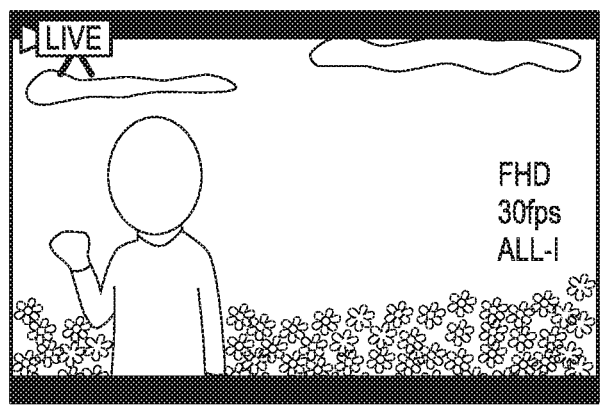

In step S311, the system control unit 50 displays, on the display unit 28, a screen indicating a shooting standby state in the live distribution mode. FIG. 9C shows an example of the screen for the shooting standby state in the live distribution mode displayed on the display unit 28 in the present embodiment.

Figure 9D:
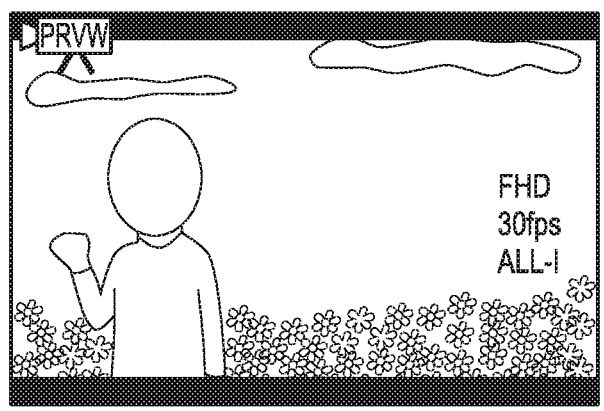

In step S312, the system control unit 50 displays, on the display unit 28, a screen indicating a shooting standby state in the preview distribution mode. FIG. 9D shows an example of the screen for the shooting standby state in the preview distribution mode displayed on the display unit 28 in the present embodiment.

In step S313, the system control unit 50 determines whether an instruction to start a self-timer setting screen has been given by the user. If it is determined that an instruction to start a self-timer setting screen has been given by the user, the system control unit 50 advances the processing to step S317, and if it is determined that the aforementioned instruction has not been given, the system control unit 50 advances the processing to step S321.

In step S314, the system control unit 50 determines whether an instruction to start a self-timer setting screen has been given by the user. If it is determined that an instruction to start a self-timer setting screen has been given by the user, the system control unit 50 advances the processing to step S318, and if it is determined that the aforementioned instruction has not been given, the system control unit 50 advances the processing to step S322.

In step S315, the system control unit 50 determines whether an instruction to start a self-timer setting screen has been given by the user. If it is determined that an instruction to start a self-timer setting screen has been given by the user, the system control unit 50 advances the processing to step S319, and if it is determined that the aforementioned instruction has not been given, the system control unit 50 advances the processing to step S323.

In step S316, the system control unit 50 determines whether an instruction to start a self-timer setting screen has been given by the user. If it is determined that an instruction to start a self-timer setting screen has been given by the user, the system control unit 50 advances the processing to step S320, and if it is determined that the aforementioned instruction has not been given, the system control unit 50 advances the processing to step S324.

In step S317, the system control unit 50 performs self-timer setting processing, which will be described with reference to FIGS. 4A and 4B. In step S318, the system control unit 50 performs the self-timer setting processing, which will be described with reference to FIGS. 4A and 4B. In step S319, the system control unit 50 performs the self-timer setting processing, which will be described with reference to FIGS. 4A and 4B. In step S320, the system control unit 50 performs the self-timer setting processing, which will be described with reference to FIGS. 4A and 4B.

In step S321, the system control unit 50 performs still image shooting processing. The details of the still image shooting processing will be described later with reference to FIGS. 5A and 5B.

In step S322, the system control unit 50 performs moving image shooting processing. The details of the moving image shooting processing will be described later with reference to FIGS. 6A and 6B.

In step S323, the system control unit 50 performs live distribution processing. The details of the live distribution processing will be described with reference to FIGS. 7A and 7B.

In step S324, the system control unit 50 performs preview distribution processing. The details of the preview distribution processing will be described with reference to FIGS. 8A and 8B.

In step S325, the system control unit 50 determines whether the power switch 72 has been turned off. If it is determined that the power switch 72 has been turned off, the system control unit 50 ends the main processing, and if it is determined that the power switch 72 has not been turned off, the system control unit 50 returns the processing to step S301.

Next, the self-timer setting processing from steps S317 to S320 will be described in detail with reference to FIGS. 4A and 4B. FIGS. 4A and 4B are flowcharts showing an example of processing from displaying a self-timer setting screen to completing self-timer setting in the present embodiment.

In step S401, the system control unit 50 displays a self-timer setting screen on the display unit 28.

Figure 11A:
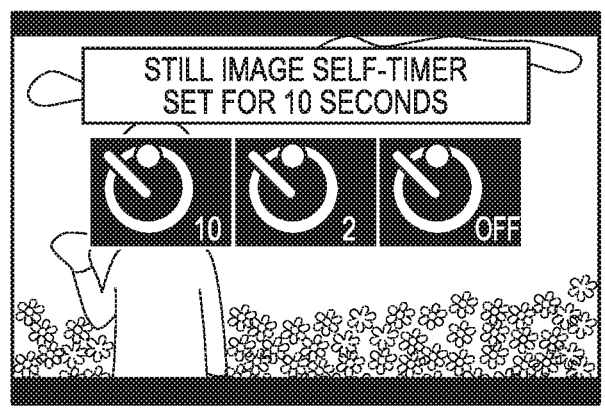
FIGS. 11A to 11D are diagrams showing respective self-timer setting screens of the still image recording mode, the moving image shooting mode, the live distribution mode, and the preview distribution mode in the embodiment.
Figure 11B:
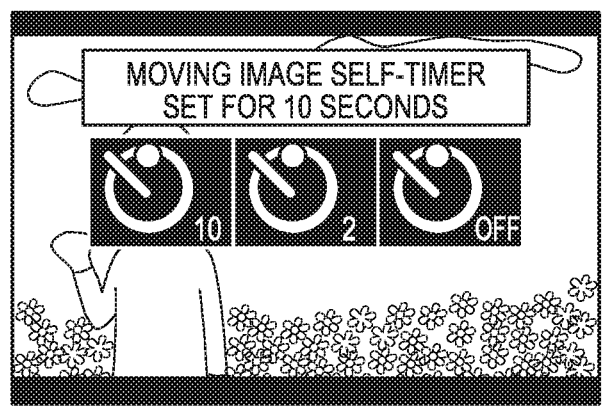
Figure 11C:
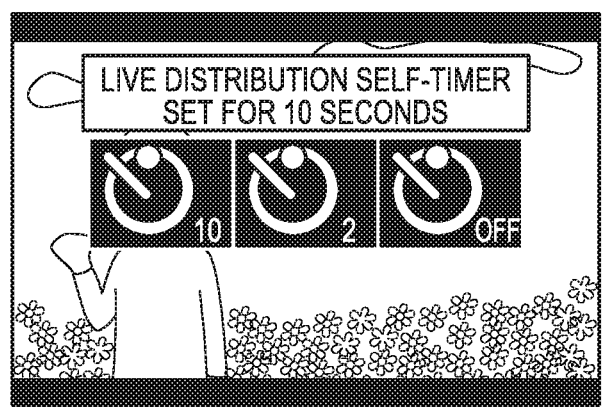
Figure 11D:
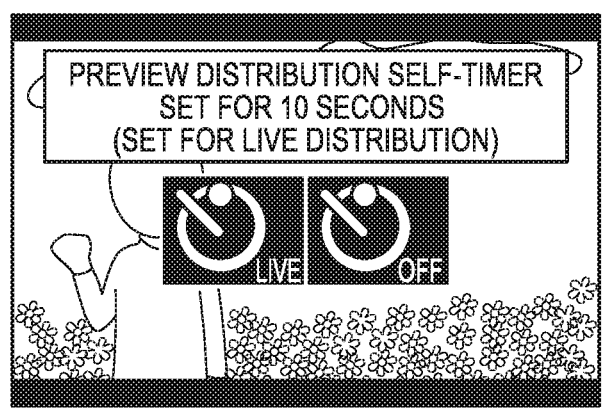

FIG. 11A shows an example of a self-timer setting screen for still image recording displayed on the display unit 28 in the present embodiment. FIG. 11B shows an example of a self-timer setting screen for moving image shooting displayed on the display unit 28. FIG. 11C shows an example of a self-timer setting screen for live distribution displayed in the display unit 28. FIG. 11D shows an example of a self-timer setting screen for preview distribution displayed on the display unit 28.

Here, the set number of seconds of the self-timer is 2 or 10; however, the set number of seconds may be a number other than these numbers, or may be set as appropriate by the user. It is to be understood that the numbers shown in the drawings are merely illustrative.

In step S402, the system control unit 50 determines whether an instruction to set a still image self-timer has been given by the user. If it is determined that an instruction to set a still image self-timer has been given by the user, the system control unit 50 advances the processing to step S403, and if it is determined that the instruction has not been given, the system control unit 50 advances the processing to step S406.

In step S403, the system control unit 50 determines whether the instructed number of seconds for which the still image self-timer has been set is 2. If it is determined that the instructed number of seconds for which the still image self-timer has been set is 2, the system control unit 50 advances the processing to step S404, and if it is determined that the instructed number of seconds is not 2 (if the instructed number of seconds is 10), the system control unit 50 advances the processing to step S405.

In step S404, the system control unit 50 sets the number of seconds of the still image self-timer to 2. In step S405, the system control unit 50 sets the number of seconds of the still image self-timer to 10.

In step S406, the system control unit 50 determines whether an instruction to set a moving image self-timer has been given by the user. If it is determined that an instruction to set a moving image self-timer has been given by the user, the system control unit 50 advances the processing to step S407, and if it is determined that the instruction has not been given, the system control unit 50 advances the processing to step S410.

In step S407, the system control unit 50 determines whether the instructed number of seconds for which the moving image self-timer has been set is 2. If it is determined that the instructed number of seconds for which the moving image self-timer has been set is 2, the system control unit 50 advances the processing to step S408, and if it is determined that the instructed number of seconds is not 2 (if the instructed number of seconds is 10), the system control unit 50 advances the processing to step S409.

In step S408, the system control unit 50 sets the number of seconds of the moving image self-timer to 2. In step S409, the system control unit 50 sets the number of seconds of the moving image self-timer to 10.

In step S410, the system control unit 50 determines whether an instruction to set a live distribution self-timer has been given by the user. If it is determined that an instruction to set a live distribution self-timer has been given, the system control unit 50 advances the processing to step S411, and if it is determined that the instruction has not been given, the system control unit 50 advances the processing to step S414.

In step S411, the system control unit 50 determines whether the instructed number of seconds for which the live distribution self-timer has been set is 2. If it is determined that the instructed number of seconds for which the live distribution self-timer has been set is 2, the system control unit 50 advances the processing to step S412, and if it is determined that the instructed number of seconds is not 2 (if the instructed number of seconds is 10), the system control unit 50 advances the processing to step S413.

In step S412, the system control unit 50 sets the number of seconds of the live distribution self-timer to 2. In step S413, the system control unit 50 sets the number of seconds of the live distribution self-timer to 10.

In step S414, the system control unit 50 determines whether an instruction to set a preview distribution self-timer has been given by the user. If it is determined that an instruction to set a preview distribution self-timer has been given by the user, the system control unit 50 advances the processing to step S415, and if it is determined that the instruction has not been given, the system control unit 50 advances the processing to step S417.

In step S415, the system control unit 50 determines whether the live distribution self-timer has been set by the user. If it is determined that the live distribution self-timer has been set, the system control unit 50 advances the processing to step S416, and if it is determined that the live distribution self-timer has not been set, the system control unit 50 advances the processing to step S417.

In step S416, the system control unit 50 changes the set number of seconds of the preview distribution self-timer to be the same as the set number of seconds of the live distribution self-timer.

Note that in the present embodiment, the effect provided by changing the set number of seconds of the preview distribution self-timer to be the same as the set number of seconds of the live distribution self-timer is as follows: For a user who wishes to check whether an inadvertent appearance of the hand can be prevented within the number of seconds of the self-timer set in the live distribution, it is not necessary to change the set number of seconds of the preview distribution self-timer if the user changes only the set number of seconds of the live distribution self-timer, and therefore the number of procedures required for changing is reduced. The set number of seconds of the preview distribution self-timer may not only be set to be the same as the number of seconds of the live distribution self-timer, but also be set freely.

In step S417, the system control unit 50 determines whether an instruction to end the self-timer setting screen has been given by the user. If it is determined that an instruction to end the self-timer setting screen has been given, the system control unit 50 advances the processing to step S418, and if it is determined that the aforementioned instruction has not been given, the system control unit 50 returns the processing to step S402.

In step S418, the system control unit 50 displays a shooting standby screen on the display unit 28.

Figure 5A:
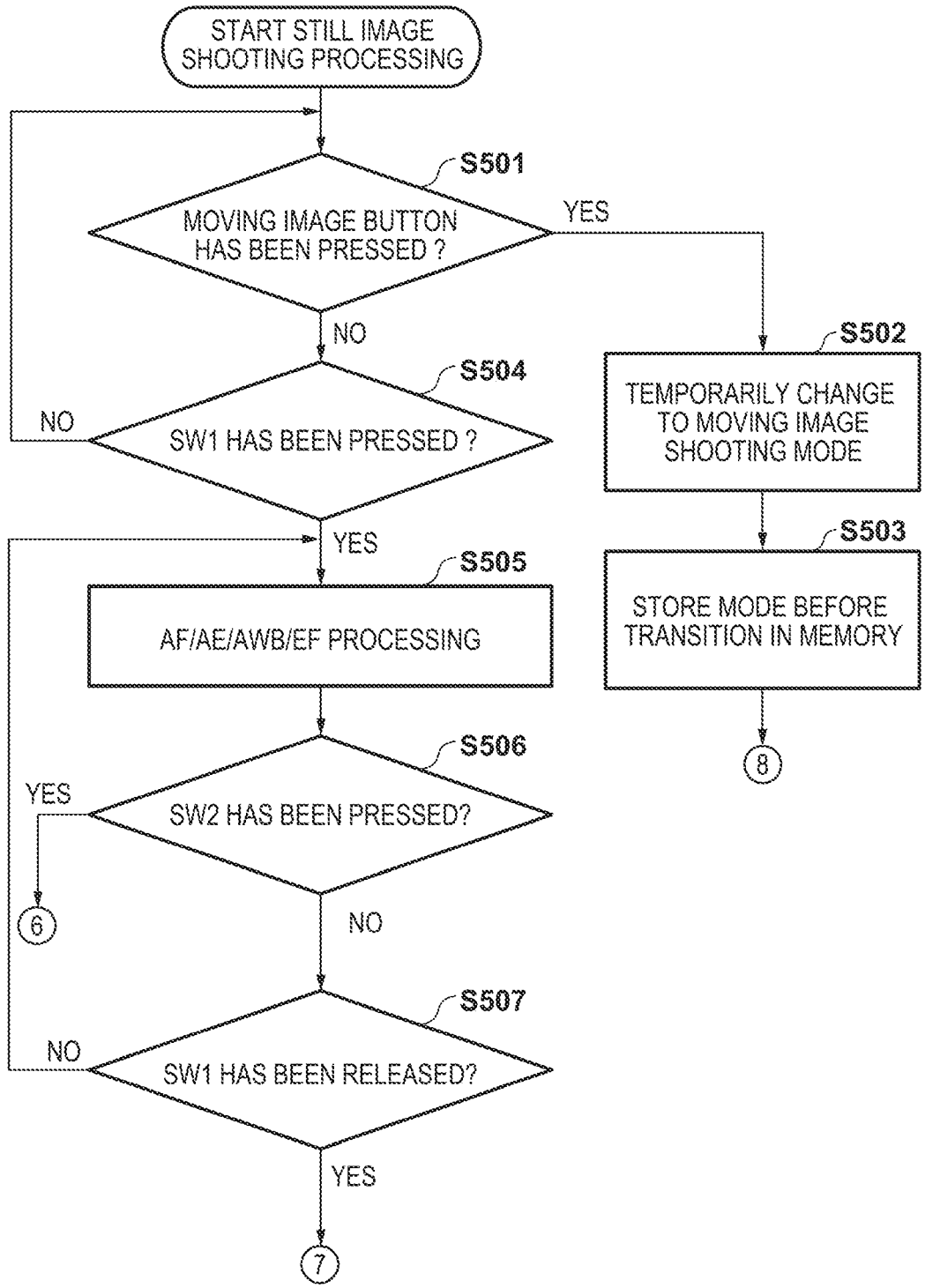
FIGS. 5A and 5B are diagrams showing a flowchart of still image shooting processing in the embodiment.
Figure 5B:
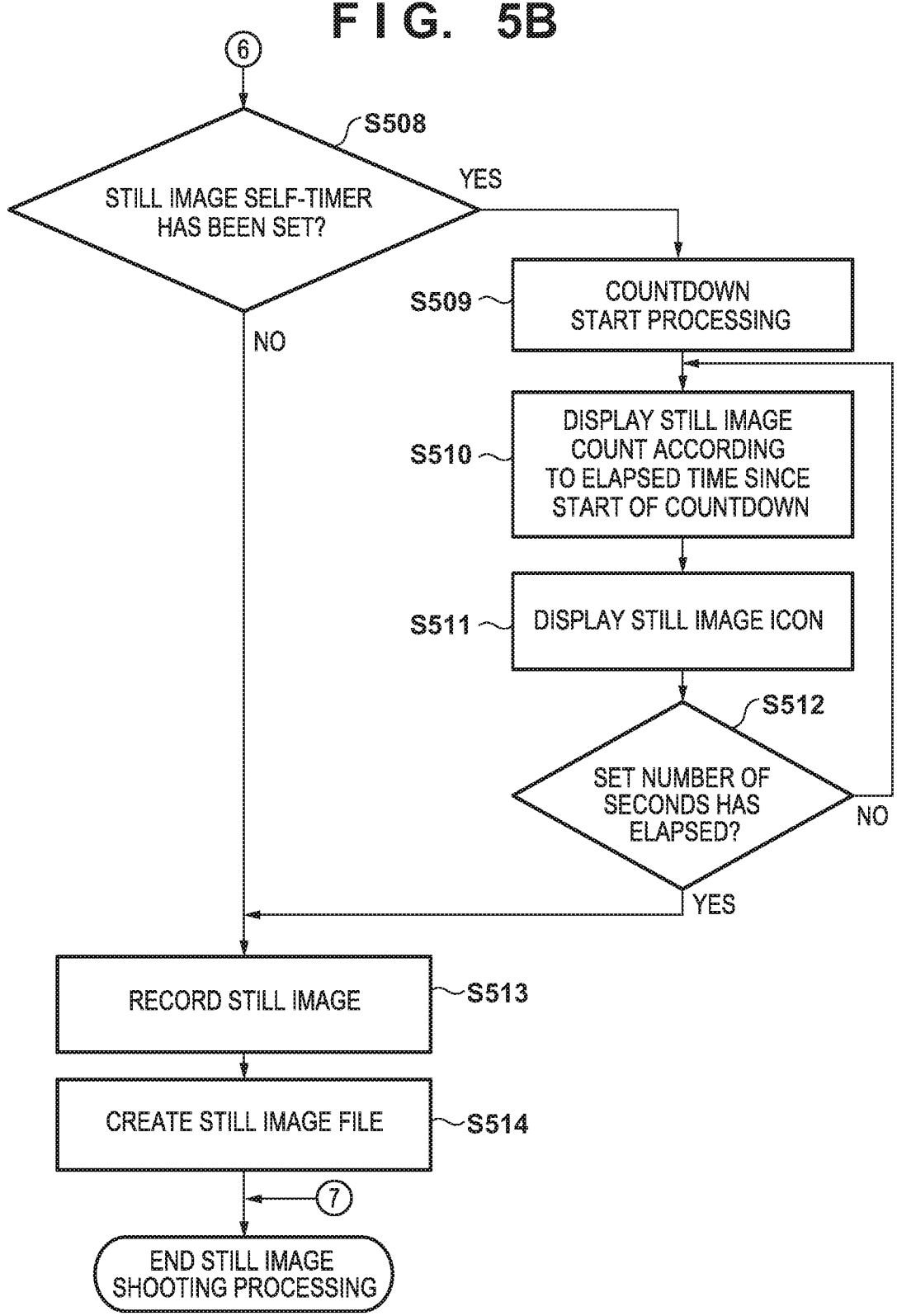

Next, the still image shooting processing in step S321 shown in FIG. 3A will be described with reference to the flowcharts shown in FIGS. 5A and 5B. FIGS. 5A and 5B are flowcharts showing an example of processing performed from when the shutter button 61 has been pressed until still image capturing is completed in the present embodiment.

In step S501, the system control unit 50 determines whether the moving image button 76 has been pressed. If it is determined that the moving image button 76 has been pressed, the system control unit 50 advances the processing to step S502, and if it is determined that the moving image button 76 has not been pressed, the system control unit 50 advances the processing to step S504.

In step S502, the system control unit 50 changes the camera state to a temporary moving image shooting mode. The temporary moving image shooting mode refers to a mode in which the camera state is changed to the moving image shooting mode only when a moving image is being recorded, and the camera state is returned to the still image recording mode when the recording of the moving image ends. In step S503, the system control unit 50 stores the mode before the transition in the memory 32. Then, the system control unit 50 advances the processing to step S602 in FIG. 6A, which will be described later.

In step S504, the system control unit 50 determines whether a first shutter switch signal SW1 resulting from the shutter button 61 being half-pressed has been generated. If it is determined that the first shutter switch signal SW1 has been generated, the system control unit 50 advances the processing to step S505, and if it is determined that the first shutter switch signal SW1 has not been generated, the system control unit 50 returns the processing to step S501. That is, the system control unit 50 waits for generation of the first shutter switch signal SW1 (half-pressing of the shutter button 61).

In step S505, in response to the generation of the first shutter switch signal SW1, the system control unit 50 starts shooting preparation operations such as auto focus (AF) processing, auto exposure (AE) processing, auto white balance (AWB) processing, and pre-flash (EF) processing.

In step S506, the system control unit 50 determines whether a second shutter switch signal SW2 resulting from the shutter button 61 being full-pressed has been generated. If it is determined that the second shutter switch signal SW2 has been generated, the system control unit 50 advances the processing to step S508, and if it is determined that the second shutter switch signal SW2 has not been generated, the system control unit 50 advances the processing to step S507.

In step S507, the system control unit 50 determines whether the user has stopped pressing the shutter button 61, based on the first shutter switch signal SW1. If it is determined that the user has stopped pressing the shutter button 61, the system control unit 50 ends the still image shooting processing, and if it is determined that the half-pressed state of the shutter button 61 continues, the system control unit 50 returns the processing to step S505.

In step S508, the system control unit 50 determines whether the still image self-timer has been set. If it is determined that the still image self-timer has been set, the system control unit 50 advances the processing to step S509, and if it is determined that the still image self-timer has not been set, the system control unit 50 advances the processing to step S513.

Figure 10A:
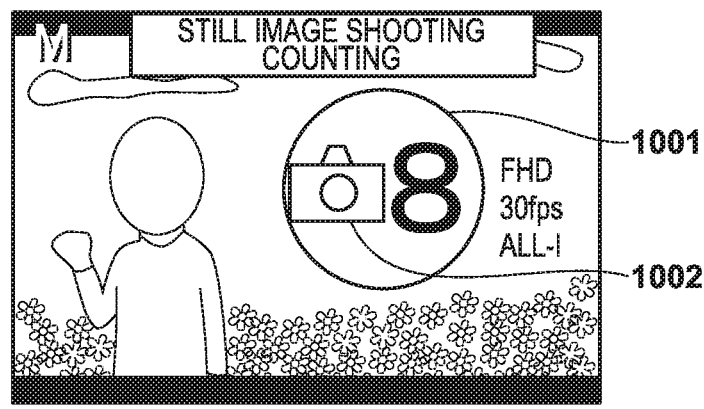
FIGS. 10A to 10D are diagrams showing respective screens during counting of a self-timer of the still image recording mode, the moving image shooting mode, the live distribution mode, and the preview distribution mode in the embodiment.

In step S509, the system control unit 50 starts countdown processing of the still image self-timer. In step S510, the system control unit 50 displays a still image count on the display unit 28 according to the elapsed time of the countdown of the still image self-timer. FIG. 10A shows an example of a screen displayed on the display unit 28 when the still image self-timer is counting in the present embodiment, and reference numeral 1001 in FIG. 10A is an example of display of the still image count (the remaining time is "8" seconds in FIG. 10A).

As will be clarified through the following description, in the present embodiment, the still image count is characterized by having a size smaller than the sizes of a moving image count, a live distribution count, and a preview distribution count. This characteristic also enables the user to determine whether a given image is a still image, based on the count size of the self-timer.

In step S511, the system control unit 50 displays an icon indicating a still image on the display unit 28. Reference numeral 1002 in FIG. 10A is an example of display of a still image icon displayed on the display unit 28 in the present embodiment, and this still image icon is also an icon that is not displayed on the still image shooting standby screen shown in FIG. 9A, and appears simultaneously with the start of counting.

In step S512, the system control unit 50 determines whether the set number of seconds has elapsed since the start of still image countdown. If it is determined that the set number of seconds has elapsed since the start of still image countdown, the system control unit 50 advances the processing to step S513, and if it is determined that the set number of seconds has not elapsed, the system control unit 50 returns the processing to step S510.

In step S513, the system control unit 50 performs still image shooting processing such as reading out a signal from the image capturing unit 22, development processing, and encoding.

In step S514, the system control unit 50 performs still-image creation processing for writing image data captured in the recording medium 200 as an image file.

Note that this flow may be interrupted if an abnormal operation such as rotation of a mode dial during the flow is performed.

Figure 6A:
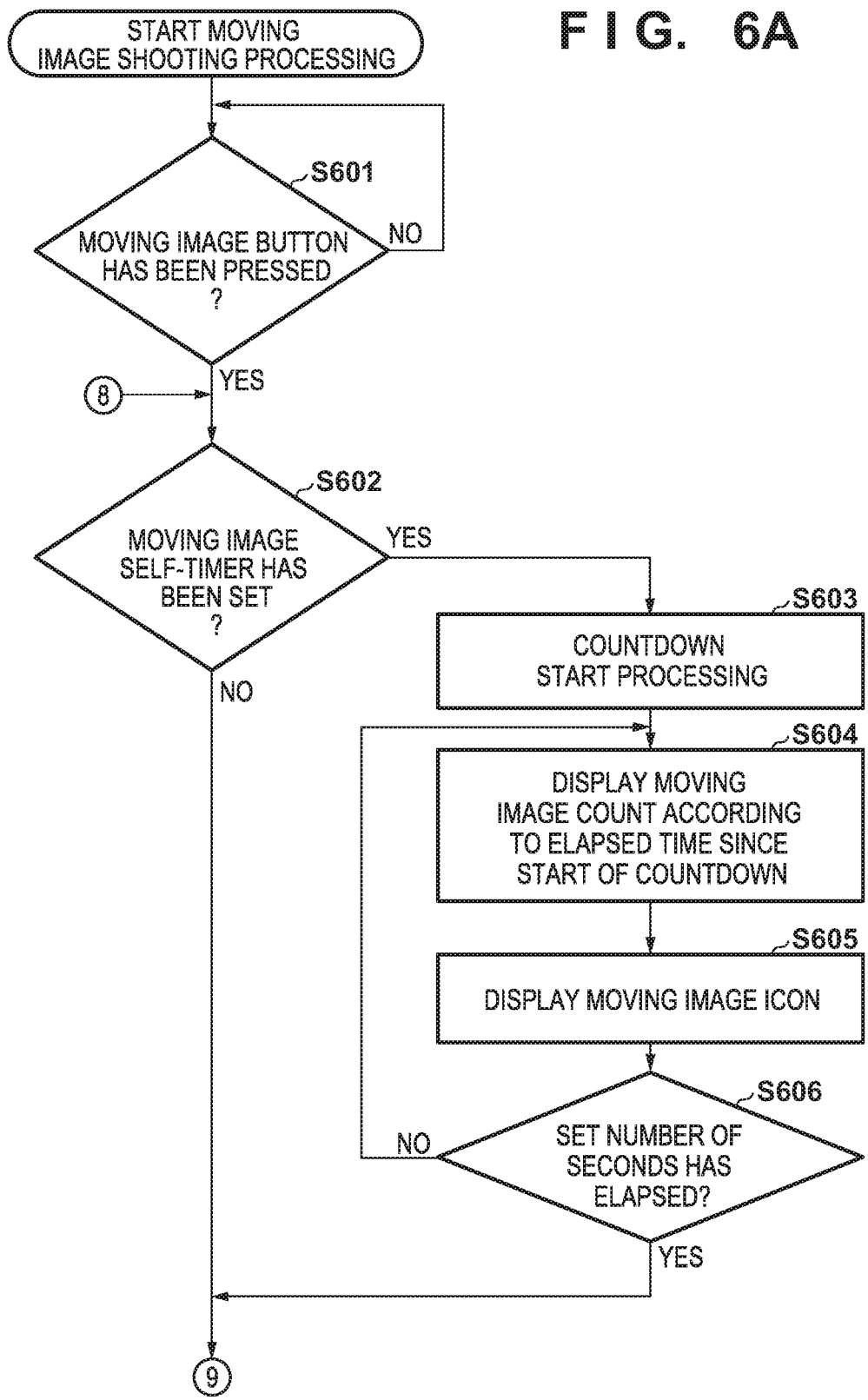
FIGS. 6A and 6B are diagrams showing a flowchart of moving image shooting processing in the embodiment.
Figure 6B:
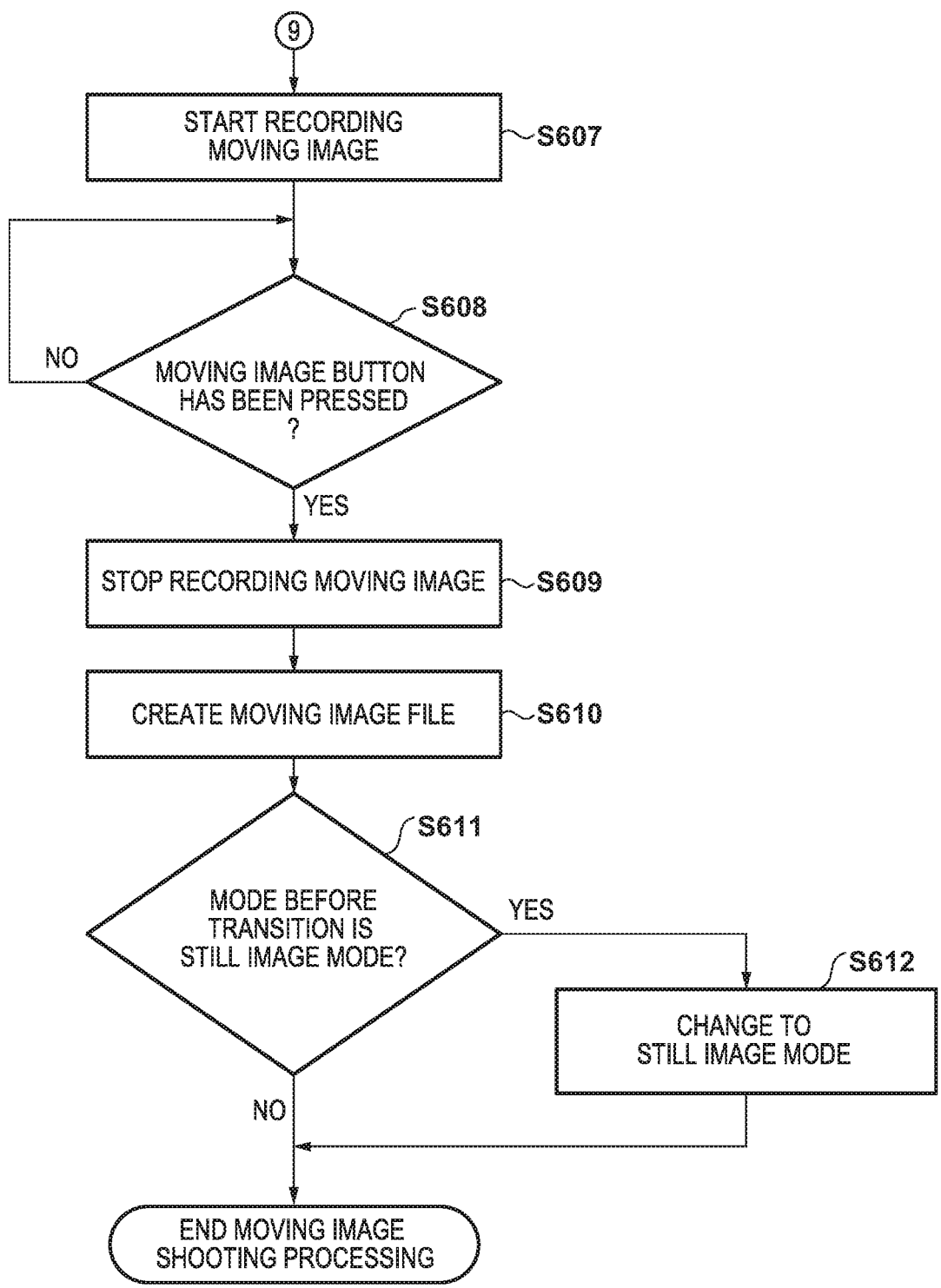

Next, an operation procedure for the moving image shooting processing in step S322 shown in FIG. 3A will be described with reference to the flowcharts shown in FIGS. 6A and 6B. FIGS. 6A and 6B are flowcharts showing an example of processing performed from when the moving image button 76 has been pressed until moving image capturing is completed in the present embodiment.

In step S601, the system control unit 50 determines whether the moving image button 76 has been pressed. If it is determined that the moving image button 76 has been pressed, the system control unit 50 advances the processing to step S602, and if it is determined that the moving image button 76 has not been pressed, the system control unit 50 returns the processing to S601.

In step S602, the system control unit 50 determines whether the moving image self-timer has been set. If it is determined that the moving image self-timer has been set, the system control unit 50 advances the processing to step S603, and if it is determined that the moving image self-timer has not been set, the system control unit 50 advances to step S607.

In step S603, the system control unit 50 starts countdown processing of the moving image self-timer.

Figure 10B:
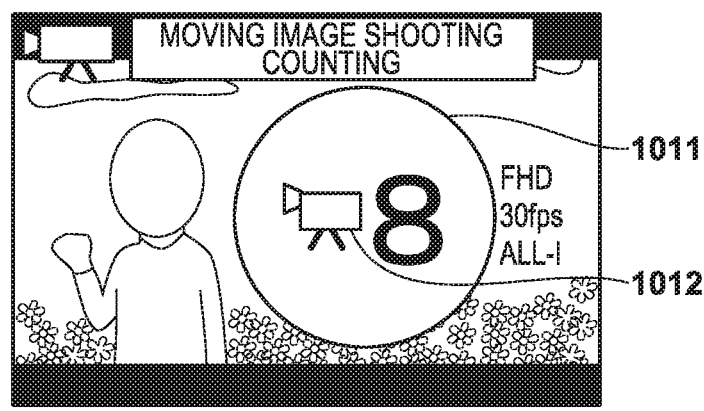

In step S604, the system control unit 50 displays a moving image count on the display unit 28 according to the elapsed time of the countdown of the moving image self-timer. FIG. 10B shows an example of a screen displayed on the display unit 28 when the moving image self-timer is counting in the present embodiment. Reference numeral 1011 in FIG. 10B is an example of display of the moving image count.

In step S605, the system control unit 50 displays an icon indicating a moving image on the display unit 28. Reference numeral 1012 in FIG. 10B is an icon indicating a moving image, and is also an icon that is not displayed on the shooting standby screen shown in FIG. 9B, and appears simultaneously with the start of counting.

In step S606, the system control unit 50 determines whether the set number of seconds has elapsed since the start of countdown. If it is determined that the set number of seconds has elapsed since the start of countdown, the system control unit 50 advances the processing to step S607, and if it is determined that the set number of seconds has not elapsed, the system control unit 50 returns the processing to step S604.

In step S607, the system control unit 50 starts moving image recording processing such as reading out an image signal from the image capturing unit 22 on a frame-by-frame basis, developing, encoding, and storage in a medium.

In step S608, the system control unit 50 determines whether an instruction to stop moving image recording has been given by the moving image button 76 being pressed. If it is determined that an instruction to stop moving image recording has been given, the system control unit 50 advances the processing to step S609, and if it is determined that the instruction has not been given, the system control unit 50 returns the processing to step S608, and waits for input of the instruction to stop recoding.

In step S609, the system control unit 50 performs moving image recording stop processing such as stopping reading out of a signal from the image capturing unit 22.

In step S610, the system control unit 50 closes the moving image file that is in the process of being recorded in the recording medium 200, and performs processing for creating the final moving image file.

In step S611, the system control unit 50 determines whether the mode before the transition that is stored in the memory 32 is the still image recording mode. If it is determined that the mode before the transition is the still image recording mode, the system control unit 50 advances the processing to step S612, and if it is determined that the mode before the transition is not the still image recording mode, the system control unit 50 ends this moving image shooting processing.

In step S612, the system control unit 50 changes the camera state to the still image recording mode.

Note that this flow may be interrupted if an abnormal operation such as rotation of a mode dial during the flow is performed.

Figure 7A:
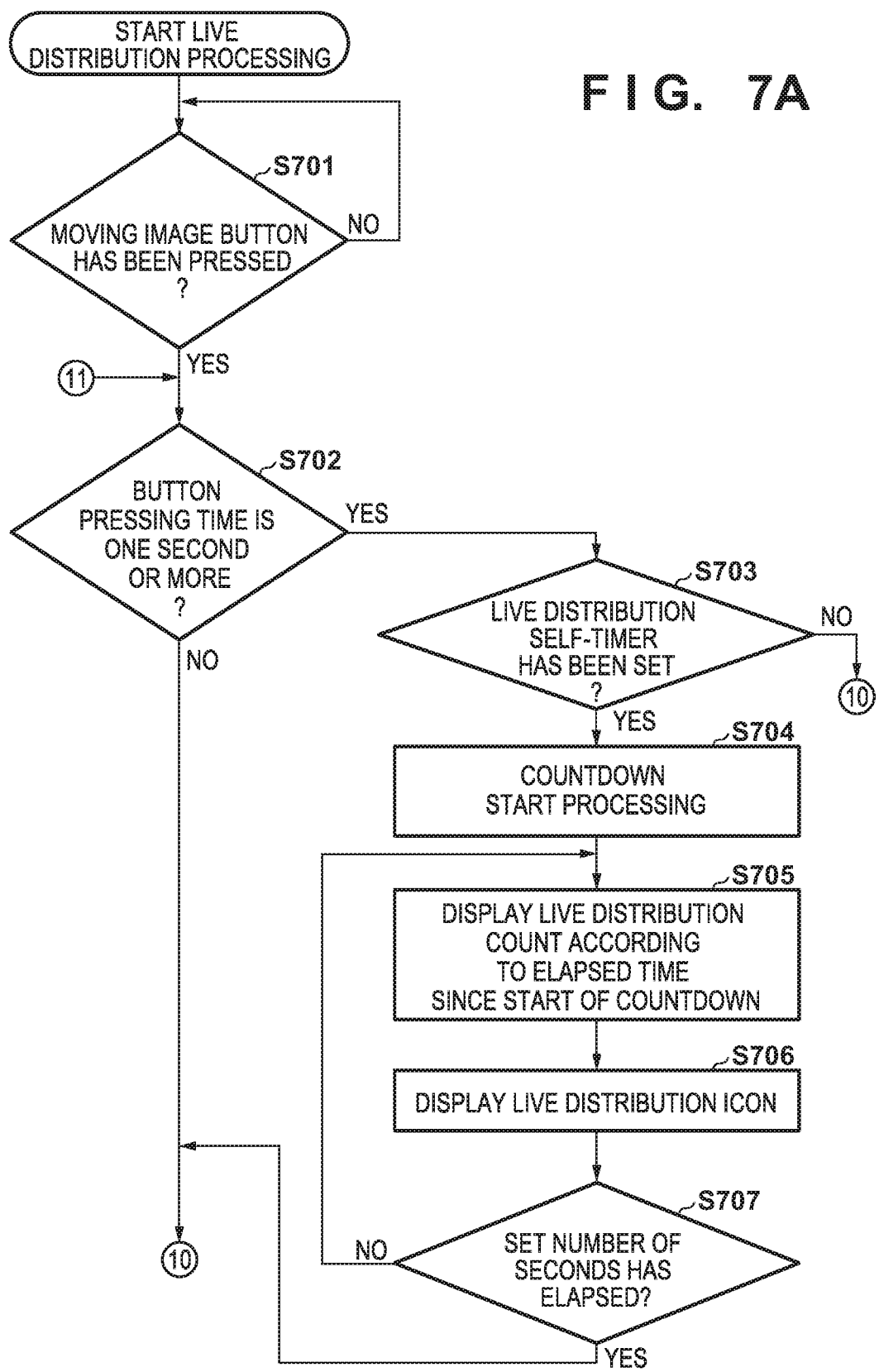
FIGS. 7A and 7B are diagrams showing a flowchart of live distribution processing in the embodiment.
Figure 7B:
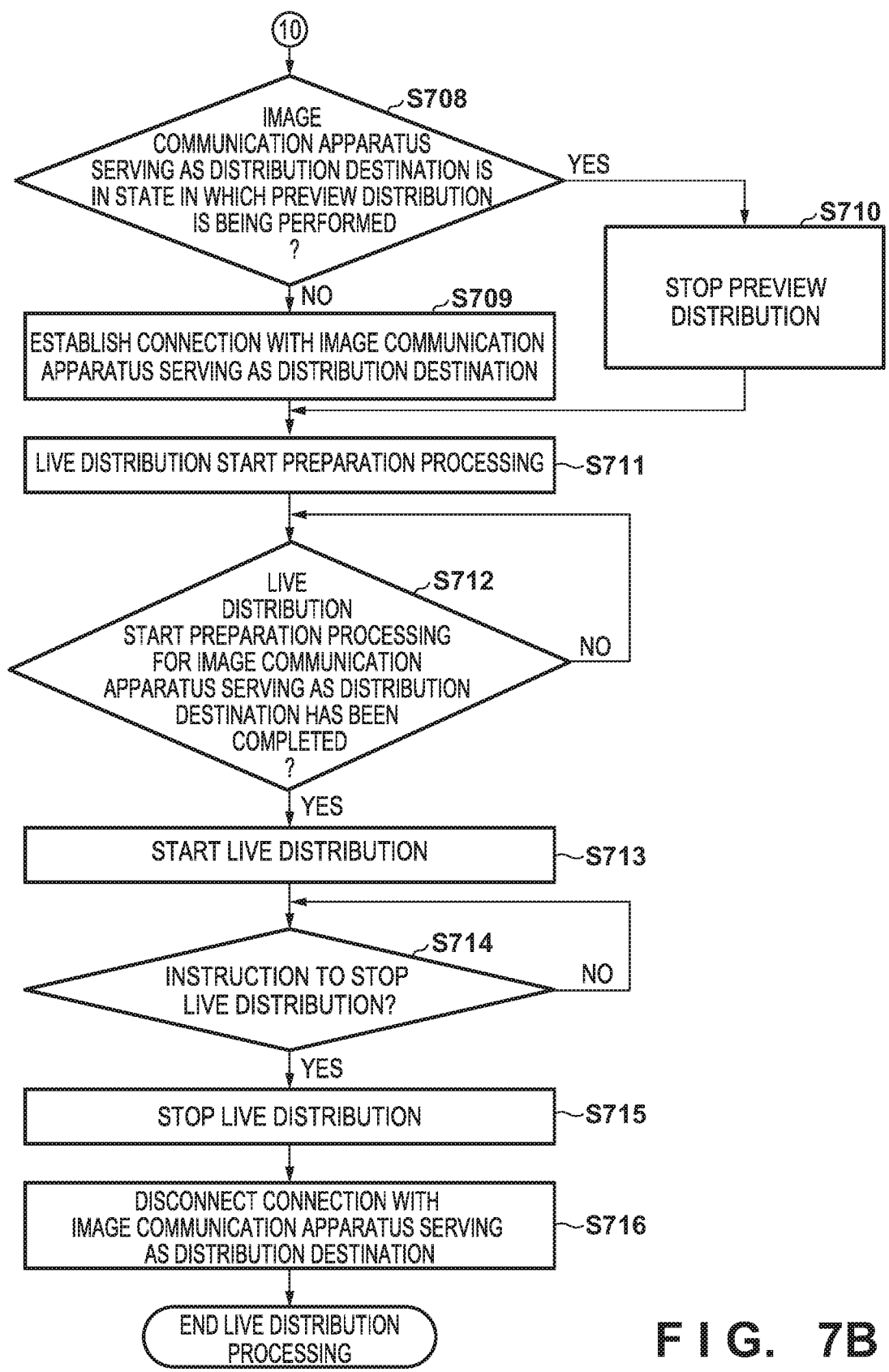

Next, an operation procedure for the live distribution processing in step S323 shown in FIG. 3B will be described with reference to FIGS. 7A and 7B. FIGS. 7A and 7B are flowcharts showing an example of processing performed from when the moving image button 76 has been pressed until live distribution is completed in the present embodiment.

In step S701, the system control unit 50 determines whether the moving image button 76 has been pressed by the user. If it is determined that the moving image button 76 has been pressed, the system control unit 50 advances the processing to step S702, and if it is determined that the moving image button 76 has not been pressed, the system control unit 50 returns the processing to step S701.

In step S702, the system control unit 50 determines whether the pressing time of the moving image button 76 is one second or more, i.e., whether the moving image button 76 has been pressed and held. If it is determined that the pressing time of the moving image button is one second or more, i.e., the moving image button 76 has been pressed and held, the system control unit 50 advances the processing to step S703, and if it is determined that the pressing time is less than (below) one second, i.e., the moving image button 76 has been pressed and released, the system control unit 50 advances the processing to step S708. Although the determination is made here with reference to one second, it is also possible to allow the user to set the reference time, and determination may be made based on whether the pressing time is greater than or equal to the set reference time.

In step S703, the system control unit 50 determines whether the live distribution self-timer has been set. If it is determined that the live distribution self-timer has been set, the system control unit 50 advances the processing to step S704, and if it is determined that the live distribution self-timer has not been set, the system control unit 50 advances the processing to step S708.

That is, regardless of whether the user has pressed and released the moving image button 76, or the user has pressed and held the moving image button 76, the system control unit 50 skips countdown processing, which will be described below, if the live distribution timer has not been set.

Figure 10C:
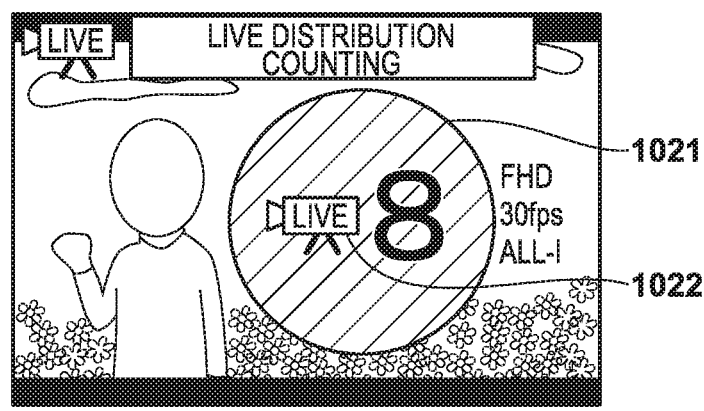

In step S704, the system control unit 50 starts countdown processing of the live distribution self-timer. In step S705, the system control unit 50 displays a live distribution count on the display unit 28 according to the elapsed time of the countdown of the live distribution self-timer. FIG. 10C shows an example of a screen displayed on the display unit 28 when the live distribution self-timer is counting in the present embodiment. Reference numeral 1021 shown in FIG. 10C is an example of display of the live distribution count.

Note that in the present embodiment, the live distribution count is characterized by having a color different from the colors of the still image count, the moving image count, and the preview distribution count. This provides an effect that the user can determine whether the mode is live distribution based on the color of the self-timer.

In step S706, the system control unit 50 displays a live distribution icon on the display unit 28. Reference numeral 1022 in FIG. 10C is an example of display of the live distribution icon displayed on the display unit 28 in the present embodiment. The icon 1022 is an icon that is not displayed when the shooting standby screen in FIG. 9C is displayed, and appears simultaneously with the start of counting.

In step S707, the system control unit 50 determines whether the set number of seconds has elapsed since the start of countdown. If it is determined that the set number of seconds has elapsed since the start of countdown, the system control unit 50 advances the processing to step S708, and if it is determined that the set number of seconds has not elapsed, the system control unit 50 continues the countdown by returning the processing to step S705.

In step S708, the system control unit 50 determines whether communication has already been established with an image communication apparatus serving as an image data distribution destination, and preview distribution is being performed between the camera and the image communication apparatus. If it is determined that preview distribution is being performed between the camera and the image communication apparatus serving as the image data distribution destination, the system control unit 50 advances the processing to step S710. If it is determined that preview distribution is not being performed between the camera and the image communication apparatus serving as the image data distribution destination (including a case where no connection is established with the image communication apparatus serving as the image data distribution destination), the system control unit 50 advances the processing to step S709.

In step S709, the system control unit 50 establishes a connection with the image communication apparatus serving as the distribution destination, using a wireless LAN function of the communication unit 54. In step S710, the system control unit 50 performs preview distribution stop processing such as a preview distribution stop request to the image communication apparatus serving as the image data distribution destination.

In step S711, the system control unit 50 transmits, for example, a request to the image communication apparatus serving as the image data distribution destination to prepare to start live distribution, thus prompting live distribution start preparation processing.

In step S712, the system control unit 50 receives state information from the image communication apparatus serving as the image data distribution destination, and, based on this information, determines whether the image communication apparatus has completed preparation to start live distribution. If it is determined that the preparation to start live distribution by the image communication apparatus serving as the image data distribution destination has been completed, the system control unit 50 advances the processing to step S713, and if it is determined that the preparation to start live distribution has not been completed, the system control unit 50 returns the processing to step S712, and waits for completion of the preparation.

In step S713, an image acquired by reading out a signal from the image capturing unit 22 is distributed to the image communication apparatus via the communication unit 54. Consequently, live distribution of the image, such as making the image publicly available to a third party, is started.

In step S714, the system control unit 50 determines whether an instruction to stop live distribution has been given by the moving image button 76 being pressed. If it is determined that an instruction to stop live distribution has been given, the system control unit 50 advances the processing to step S715, and if it is determined that the instruction has not been given, the system control unit 50 returns the processing to step S714, and continues the live distribution until an instruction to stop live distribution is given.

In step S715, the system control unit 50 performs live distribution stop processing such as stopping reading out of a signal from the image capturing unit 22 and interrupting public exposure of the distribution data to a third party.

In step S716, the system control unit 50 disconnects the connection with the image communication apparatus serving as the distribution destination established using the wireless LAN function of the communication unit 54.

Note that this flow may be interrupted if an abnormal operation such as rotation of a mode dial during the flow is performed.

Figure 8A:
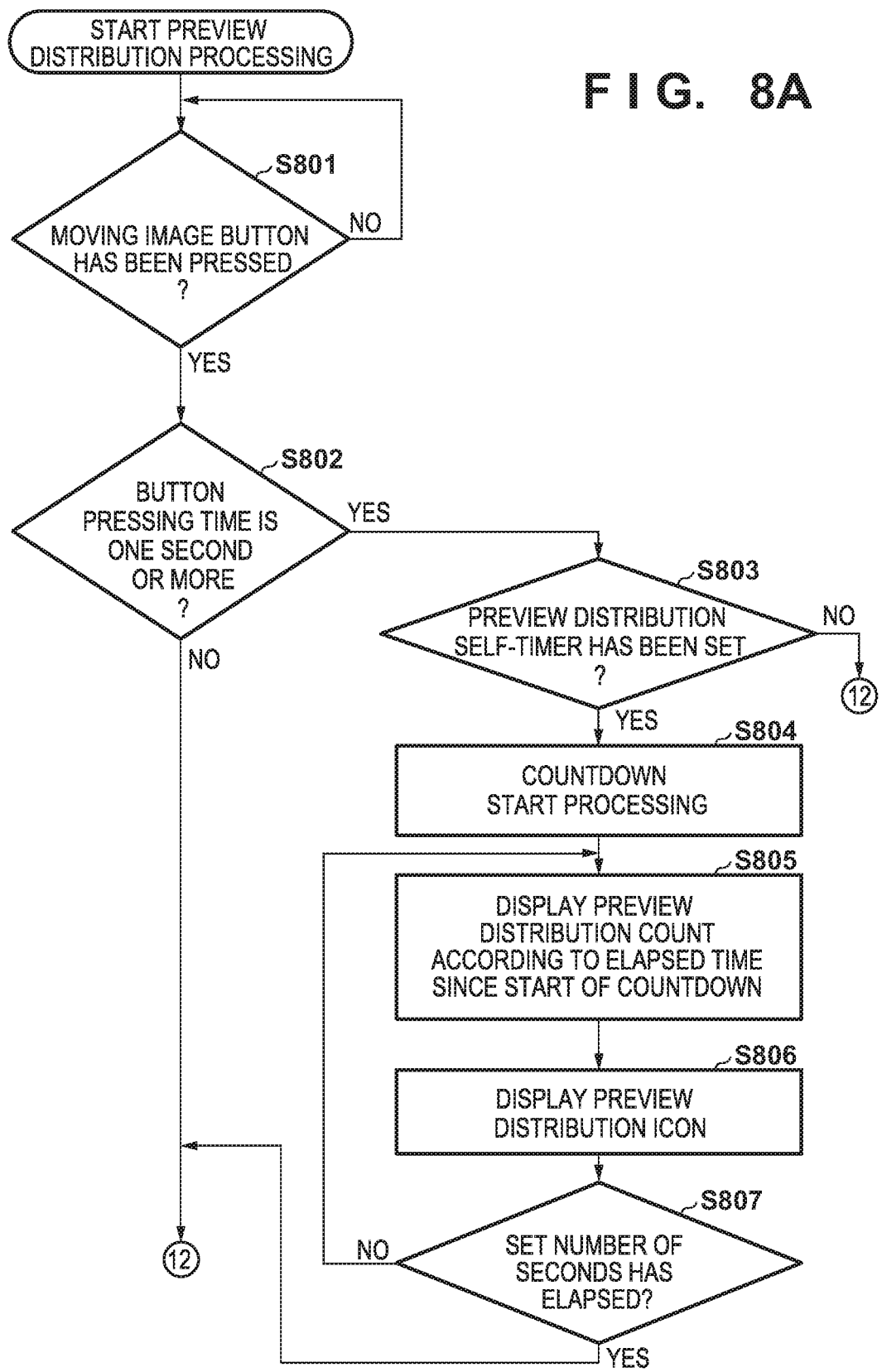
FIGS. 8A and 8B are diagrams showing a flowchart of preview distribution processing in the embodiment.
Figure 8B:
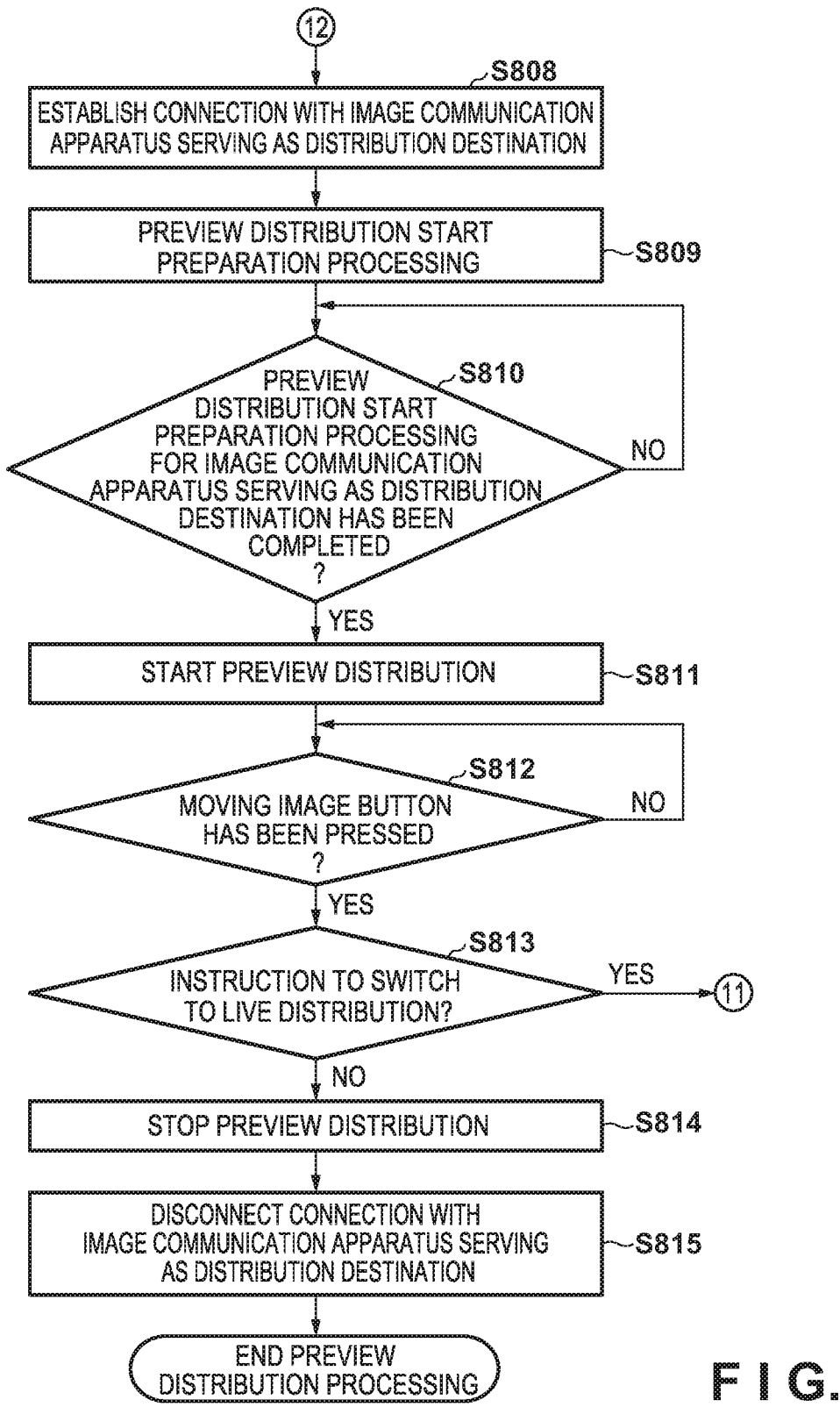

Next, an operation procedure for the preview distribution processing in step S324 shown in FIG. 3B will be described with reference to FIGS. 8A and 8B. FIGS. 8A and 8B are flowcharts showing an example of processing performed from when the moving image button 76 has been pressed until preview distribution is completed in the present embodiment.

In step S801, the system control unit 50 determines whether the moving image button 76 has been pressed by the user. If it is determined that the moving image button 76 has been pressed, the system control unit 50 advances the processing to step S802, and if it is determined that the moving image button 76 has not been pressed, the system control unit 50 returns the processing to step S801.

In step S802, the system control unit 50 determines whether the moving image button 76 has been pressed for one second or more by the user, i.e., whether the moving image button 76 has been pressed and held by the user. If it is determined that the pressing time of the moving image button 76 is one second or more, i.e., the moving image button 76 has been pressed and held, the system control unit 50 advances the processing to step S803, and if it is determined that the pressing time of the moving image button 76 is less then one second, i.e., the moving image button 76 has been pressed and released, the system control unit 50 advances the processing to step S808.

In step S803, the system control unit 50 determines whether the preview distribution self-timer has been set. If it is determined that the preview distribution self-timer has been set, the system control unit 50 advances the processing to step S804, and if it is determined that the preview distribution self-timer has not been set, the system control unit 50 advances the processing to step S808.

Figure 10D:
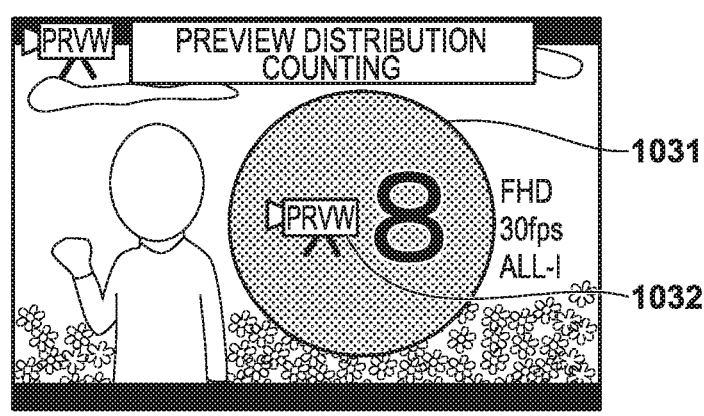

In step S804, the system control unit 50 starts countdown processing of the preview distribution self-timer. In step S805, the system control unit 50 displays a preview distribution count on the display unit 28 according to the elapsed time of the countdown of the preview distribution self-timer. FIG. 10D shows an example of a screen displayed on the display unit 28 when the preview distribution self-timer is counting in the present embodiment. Reference numeral 1031 in FIG. 10D shows an example of display of the preview distribution count.

Note that in the present embodiment, the preview distribution count is characterized by having a color different from the colors of the still image count, the moving image count, and the live distribution count. This provides an effect that the user can determine whether the mode is preview distribution based on the color of the count of the self-timer.

In step S806, the system control unit 50 displays a preview distribution icon on the display unit 28. Reference numeral 1032 in FIG. 10D indicates the preview distribution icon. The icon 1032 is not displayed on the shooting standby screen shown in FIG. 9D, and is displayed only after countdown has been started.

In step S807, the system control unit 50 determines whether the set number of seconds has elapsed since the start of countdown. If it is determined that the set number of seconds has elapsed since the start of countdown, the system control unit 50 advances the processing to step S808, and if it is determined that the set number of seconds has not elapsed, the system control unit 50 returns the processing to step S805.

In step S808, the system control unit 50 establishes a connection with the image communication apparatus serving as the distribution destination, using a wireless LAN function of the communication unit 54.

In step S809, the system control unit 50 transmits, for example, a request to the image communication apparatus serving as the image data distribution destination to prepare to start preview distribution, thus prompting preview distribution start preparation processing.

In step S810, the system control unit 50 determines whether preparation to start preview distribution by the image communication apparatus serving as the image data distribution destination has been completed, based on state information received from the image communication apparatus serving as the image data distribution destination. If it is determined that the preparation to start preview distribution by the image communication apparatus serving as the image data distribution destination has been completed, the system control unit 50 advances the processing to step S811, and if it is determined that the preparation to start preview distribution has not been completed, the system control unit 50 returns the processing to step S810, and waits for completion of the preparation.

In step S811, the system control unit 50 starts preview distribution processing such as distributing an image acquired by reading out a signal from the image capturing unit 22 to the image communication apparatus.

In step S812, the system control unit 50 determines whether the moving image button 76 has been pressed. If it is determined that the moving image button 76 has been pressed, the system control unit 50 advances the processing to step S813, and if it is determined that the moving image button 76 has not been pressed, the system control unit 50 returns the processing to step S812, and waits for pressing of the moving image button 76.

In step S813, the system control unit 50 determines whether a live distribution switching function is assigned to the moving image button 76. If it is determined that the live distribution switching function is assigned to the moving image button 76, the system control unit 50 advances the processing to step S702 in FIG. 7A, and if it is determined that the live distribution switching function is not assigned, the system control unit 50 advances the processing to step S814.

Note that the assignment of the live distribution switching function may be changed according to the change of the menu setting, or the model of the apparatus to be equipped with the function. Also, an instruction to switch to live distribution may be given by pressing the moving image button 76 twice, or switching to live distribution may be performed using an operation member other than the moving image button 76.

In step S814, the system control unit 50 performs preview distribution stop processing such as stopping reading out of a signal from the image capturing unit 22 and interrupting distribution of image data. In step S815, the system control unit 50 disconnects the connection, established using the wireless LAN function of the communication unit 54, with the image communication apparatus serving as the distribution destination.

Note that this flow may be interrupted if an abnormal operation such as rotation of a mode dial during the flow is performed.

Next, another example of the mutual transition between the preview distribution mode and the live distribution mode will be described in the following.

Figure 12A:
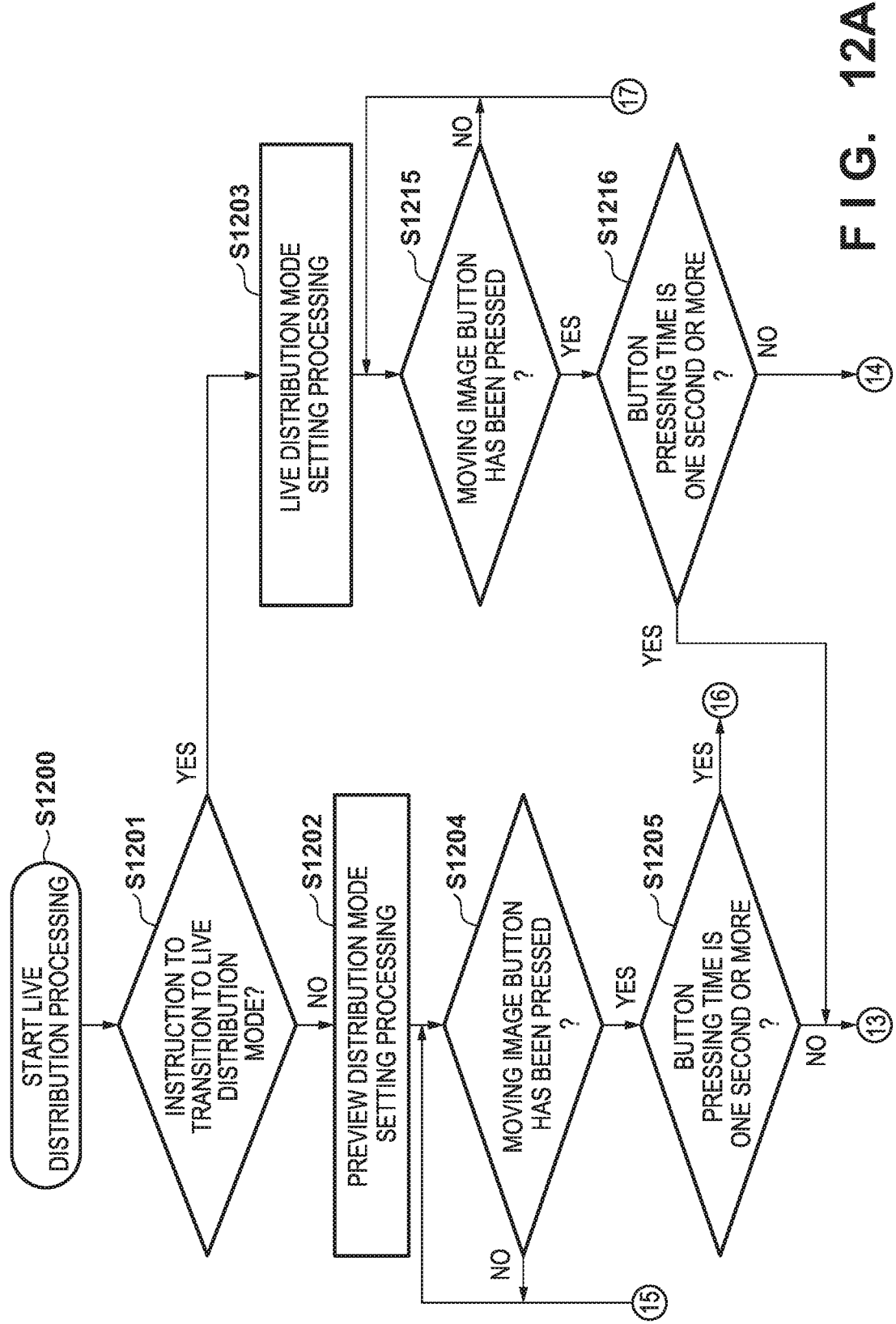

FIGS. 12A-12C are flowcharts of a series of main processing performed from selection of live distribution or preview distribution to completion of live distribution or preview distribution in the present embodiment. Each processing shown in FIGS. 12A-12C is implemented by the system control unit 50 loading the program stored in the non-volatile memory 56 to the system memory 52 and executing the program, when the power switch 72 is turned on.

In step S1201, the system control unit 50 determines whether an instruction to transition to the live distribution mode, or an instruction to transition to the preview distribution mode, has been given by the user. If it is determined that an instruction to transition to the live distribution mode has been given, the system control unit 50 advances the processing to step S1203. If it is determined that an instruction to transition to the preview distribution mode has been given, the system control unit 50 advances the processing to step S1202.

In step S1202, the system control unit 50 performs preview distribution mode setting processing. Then, in step S1204, the system control unit 50 determines whether the moving image button 76 has been pressed by the user. If it is determined that the moving image button 76 has been pressed, the system control unit 50 advances the processing to step S1205, and if it is determined that the moving image button 76 has not been pressed, the system control unit 50 returns the processing to step S1204, and waits for pressing of the moving image button 76.

In step S1205, the system control unit 50 determines whether the pressing time of the moving image button 76 is one second or more. If it is determined that the pressing time of the moving image button 76 is one second or more, the system control unit 50 advances the processing to step S1217. If it is determined that the pressing time of the moving image button 76 is less than one second, the system control unit 50 advances the processing to step S1206.

In step S1206, the system control unit 50 starts preview distribution. Then, in step S1207, the system control unit 50 displays, at a predetermined position on the screen, an icon indicating that preview distribution is being performed. Note that the displaying of this icon may be replaced by blinking the icon displayed on the upper left corner of FIG. 9D or changing the color thereof.

Then, in step S1208A, the system control unit 50 determines whether the moving image button 76 has been pressed again by the user. If it is determined that the moving image button 76 has not been pressed again by the user, the system control unit 50 returns the processing to step S1208A, and continues the preview distribution. If it is determined that the moving image button 76 has been pressed again by the user, the system control unit 50 advances the processing to step S1208B.

In step S1208B, the system control unit 50 determines whether the time for which the moving image button 76 has been pressed by the user is one second or more. If it is determined that the pressing time of the moving image button 76 is one second or more, the system control unit 50 advances the processing to step S1210, and if it is determined that the pressing time is less than one second, the system control unit 50 advances the processing to step S1209.

In step S1209, the system control unit 50 stops the preview distribution, and returns the processing to step S1204. That is, when a transition to the preview distribution mode has been made, preview distribution is performed if the moving image button 76 is pressed for less than one second, and preview distribution is stopped if the moving image button 76 is pressed again for less than one second.

As described above, the processing advances to step S1210 if the user has pressed the moving image button 76 for one second or more when a preview image is being distributed. If this condition is satisfied, the system control unit 50 performs switching from the preview distribution mode to the live distribution mode (switching of the transmission destination). However, in the embodiment, the user is allowed to select the timing at which actual live image distribution is started in the live distribution mode. The following is a specific example thereof.

In step S1210, the system control unit 50 alternately displays the message "TIMER ON" and the message "TIMER OFF" at a preset time interval (e.g., one second) on the display unit 28 until releasing of the pressing of the moving image button 76 by the user is detected. Note that the system control unit 50 continues the preview distribution when the pressing of the moving image button 76 by the user is being detected.

In step S1211, the system control unit 50 determines whether the pressing of the moving image button 76 by the user has been released at the timing when the "TIMER ON" message is being displayed. If it is determined that the pressing of the moving image button 76 has been released at the timing when "TIMER ON" is being displayed, the system control unit 50 advances the processing to step S1212, and if it is determined that the pressing of the moving image button 76 has been released at the timing when "TIMER OFF" is being displayed, the system control unit 50 advances the processing to step S1217.

In step S1212, the system control unit 50 starts countdown processing. The time of this countdown is a time set by the user when setting the configuration of the live distribution mode. Then, in step S1213, the system control unit 50 displays a count until the start of live distribution on the display unit 28 according to the elapsed time of the countdown. In step S1214, the system control unit 50 determines whether the set number of seconds has elapsed. If it is determined that the set number of seconds has elapsed, the system control unit 50 advances the processing to step S1217, and if it is determined that the set number of seconds has not been elapsed, the system control unit 50 returns the processing to step S1213, and waits for an elapse of the set time.

In step S1203, the system control unit 50 performs live distribution mode setting processing. In step S1215, the system control unit 50 determines whether the moving image button 76 has been pressed. If it is determined that the moving image button 76 has been pressed, the system control unit 50 advances the processing to step S1216, and if it is determined that the moving image button 76 has not been pressed, the system control unit 50 returns the processing to step S1215, and waits for pressing of the moving image button 76.

In step S1216, the system control unit 50 determines whether pressing time of the moving image button 76 by the user is one second or more. If it is determined that the pressing time of the moving image button 76 is one second or more, the system control unit 50 advances the processing to step S1206, and if it is determined that the pressing time of the moving image button 76 is less than one second, the system control unit 50 advances the processing to step S1217.

In step S1217, the system control unit 50 starts live distribution. Then, in step S1218, the system control unit 50 displays, on the display unit 28, an icon indicating that live distribution is being performed. Note that the displaying of this icon may be replaced by blinking the icon displayed on the upper left corner of FIG. 9C or changing the color thereof.

Then, in step S1219A, the system control unit 50 determines whether the moving image button 76 has been pressed again by the user. If it is determined that the moving image button 76 has not been pressed again by the user, the system control unit 50 returns the processing to step S1219A, and continues the live distribution. If it is determined that the moving image button 76 has been pressed again by the user, the system control unit 50 advances the processing to step S1219B.

In step S1219B, the system control unit 50 determines whether the time for which the moving image button 76 has been pressed by the user is one second or more. If it is determined that the pressing time of the moving image button 76 is one second or more, the system control unit 50 advances the processing to step S1221, and if it is determined that the pressing time is less than one second, the system control unit 50 advances the processing to step S1220.

In step S1220, the system control unit 50 stops the live distribution, and returns the processing to step S1215. That is, when a transition to the live distribution mode has been made, live distribution is performed if the moving image button 76 is pressed for less than one second, and live distribution is stopped if the moving image button 76 is pressed again for less than one second.

As described above, the processing advances to step S1221, if the user has pressed the moving image button 76 for one second or more when live distribution is being performed. If this condition is satisfied, the system control unit 50 performs switching from the live distribution mode to the preview distribution mode. However, in the embodiment, the user is allowed to select the timing at which actual preview distribution is started in the preview distribution mode.

In step S1221, the system control unit 50 alternately displays the message "TIMER ON" and the message "TIMER OFF" at a preset time interval (e.g., one second) on the display unit 28 until releasing of the pressing of the moving image button 76 by the user is detected. Note that the system control unit 50 continues the preview distribution when the pressing of the moving image button 76 by the user is being detected.

In step S1222, the system control unit 50 determines whether the pressing of the moving image button 76 by the user has been released at the timing when the "TIMER ON" message is being displayed. If it is determined that the pressing of the moving image button 76 has been released at the timing when "TIMER ON" is being displayed, the system control unit 50 advances the processing to step S1223, and if it is determined that the pressing of the moving image button 76 has been released at the timing when "TIMER OFF" is being displayed, the system control unit 50 advances the processing to step S1206.

In step S1223, the system control unit 50 starts countdown processing. The time of this countdown is a time set by the user when setting the configuration of the preview distribution mode. Then, in step S1224, the system control unit 50 displays a count until the start of preview distribution on the display unit 28 according to the elapsed time of the countdown. In step S1225, the system control unit 50 determines whether the set number of seconds has elapsed. If it is determined that the set number of seconds has elapsed, the system control unit 50 advances the processing to step S1206, and if it is determined that the set number of seconds has not elapsed, the system control unit 50 returns the processing to step S1224, and waits for an elapse of the set time.

As described above, according to the embodiment, it is possible to transition to the live distribution mode when the preview distribution processing is being performed. Moreover, the user can select whether to perform live distribution immediately or after a countdown, by selecting the pressing time of a single button (the moving image button 76 in the embodiment) to instruct a transition. The same also applies to the transition of the preview distribution mode when the live distribution processing is being performed.

Although the above embodiment has been described taking a digital camera as an example, the present invention is applicable to any apparatus (e.g., a mobile phone, tablet PC, a smartphone, etc.) having both an image-capturing function and a communication function, and the present invention is therefore not limited by the above embodiment.

In the above embodiment, when displaying the number of the countdown, the size and the color of the display area in which that number is displayed are dependent on the shooting mode; however, the display form may be determined according to the difference in mode, and the present invention is therefore not limited by the above embodiment mode.

In addition to the functions described in the above embodiment, the digital camera 100 may further have the function of performing remote shooting by transmitting a live-view image to a smartphone, rather than performing live distribution to a server. In this case, the digital camera 100 implements live-view display on the smartphone by transmitting a captured image to the smartphone at any time, without performing countdown of the timer. In this manner, in a situation where, unlike live distribution, there is no danger of distributing any unnecessary image to a large number of unspecified people, the countdown of the timer is not performed even though this function also performs real-time capturing and transmitting of images. Accordingly, the remote shooting function can be smoothly started.

In addition, the digital camera 100 may have the function of uploading, to a server, content that has already been recorded. In this case, real-time image capturing is not performed at the timing at which an uploading operation is performed, no unnecessary content will be created as a result of the operation associated with uploading. Therefore, also in this case, the digital camera 100 uploads the content to the server without performing the countdown of the timer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-003611, filed Jan. 11, 2019, which is hereby incorporated by reference herein in its entirety.

What is claimed is:

1. An image capturing apparatus comprising an image capturing unit and a communication unit arranged to communicate with a distribution server via the internet,
wherein the image capturing apparatus comprises:
one or more processors;

a display unit;
a first time measuring unit configured to measure, if a distribution instruction for live distribution using the distribution server has been given before starting distributing an image captured by the image capturing unit to the distribution server via the communication unit, an elapsed time since the distribution instruction has been given before starting distributing an image captured by the image capturing unit to the distribution server via the communication unit;
a control unit configured to start, if the elapsed time measured by the first time measuring unit has reached a first set time, distributing an image captured by the image capturing unit to the distribution server via the communication unit; and
a second time measuring unit configured to measure, if a shooting instruction for shooting a still image has been given, an elapsed time since the shooting instruction has been given;
wherein, if the elapsed time measured by the second time measuring unit has reached a predetermined second set time, the control unit starts capturing a still image by the image capturing unit,
wherein the control unit controls the display unit to display a remaining time before reaching the first set time measured by the first time measuring unit before starting distributing an image captured by the image capturing unit to the distribution server via the communication unit, and
wherein the first time measuring unit, the second time measuring unit, and the control unit are implemented by the one or more processors.

2. The image capturing apparatus according to claim 1, further comprising:
a setting unit configured to enable a user to set the first set time.

3. The image capturing apparatus according to claim 2, wherein the setting unit is configured to set a plurality of first set times,
the distribution instruction includes an instruction to select one of the plurality of first set times, and
the control unit is configured to start distributing an image captured by the image capturing unit to the distribution server via the communication unit after the elapsed time measured by the first time measuring unit has reached the selected first set time.

4. The image capturing apparatus according to claim 3, wherein the control unit
is configured to start distributing an image captured by the image capturing unit to the distribution server via the communication unit after the selected first set time has been reached, if a preset button has been pressed by the user for a predetermined time or longer, and
is configured to start distributing an image captured by the image capturing unit to the distribution server via the communication unit without waiting for an elapse of the first set time set with the setting unit, if the preset button has been pressed by the user for less than the predetermined time.

5. The image capturing apparatus according to claim 1, wherein the image capturing apparatus has a plurality of modes including a distribution mode in which a captured image is distributed to the distribution server, and a moving image shooting mode in which a captured image is recorded as a moving image, and the control unit controls the display unit to display the remaining time before reaching the first set time measured by the first time measuring unit in the distribution mode,
the first time measuring unit is further configured to measure, if a recording instruction for recording a moving image has been given, an elapsed time since the recording instruction has been given; and
the control unit controls the display unit to display a remaining time before reaching a time which is the same as the first set time measured by the first time measuring unit in the moving image shooting mode.

6. The image capturing apparatus according to claim 5, wherein
a display of the remaining time in the distribution mode stands out from a display of the remaining time in the moving image shooting mode.

7. The image capturing apparatus according to claim 1, wherein the image capturing apparatus has a plurality of modes including a distribution mode in which a captured image is distributed to the distribution server, and a still image recording mode in which a captured image is recorded as a still image.

8. The image capturing apparatus according to claim 7, wherein
the predetermined second set time and the first predetermined set time are set individually.

9. The image capturing apparatus according to claim 7, wherein
a display of the remaining time in the distribution mode stands out from a display of the remaining time in the still image recording mode.

10. The image capturing apparatus according to claim 1, wherein the image capturing apparatus has a plurality of modes including a distribution mode in which a captured image is distributed to the distribution server, a still image recording mode in which a captured image is recorded as a still image, and a moving image shooting mode in which a captured image is recorded as a moving image, and
the control unit controls the display unit to display a display form of the remaining time in the distribution mode in a different form for each of the modes.

11. The image capturing apparatus according to claim 10, wherein the control unit controls the display unit to display the remaining time in an area having a different size dependent on each of the modes, or to display the remaining time in a different color dependent on each of the modes.

12. The image capturing apparatus according to claim 10, wherein the distribution mode includes a live distribution mode in which a captured image is distributed as a live moving image, and a preview distribution mode in which a captured image is distributed as a preview of a moving image.

13. The image capturing apparatus according to claim 1, wherein
the communication unit is further configured to communicate with a smartphone, and
the control unit is configured to transmit an image captured by the image capturing unit to the smartphone without waiting the elapsed time.

14. The image capturing apparatus according to claim 1, wherein
the control unit is configured to transmit an image captured by the image capturing unit to the distribution server without waiting the elapsed time in a case where the image is already captured and already recorded.

15. The image capturing apparatus according to claim 1, wherein
the image which is transmitted to the distribution server is not recorded.

16. The image capturing apparatus according to claim 1, wherein
the image which is transmitted to the distribution server is recorded in parallel with the distributing.

17. A control method of an image capturing apparatus including an image capturing unit, a display unit, and a communication unit arranged to communicate with a distribution server via the internet, the method comprising:
measuring, if a distribution instruction for live distribution using the distribution server has been given before starting distributing an image captured by the image capturing unit to the distribution server via the communication unit, an elapsed time since the distribution instruction has been given before starting distributing an image captured by the image capturing unit to the distribution server via the communication unit;
controlling to start, if the elapsed time measured by the time measuring processing has reached a first predetermined set time, distributing an image captured by the image capturing unit to the distribution server via the communication unit;
measuring, if a shooting instruction for shooting a still image has been given, an elapsed time since the shooting instruction has been given;
controlling to start, if the elapsed time measured by the second time measuring processing has reached a second predetermined set time, capturing a still image by the image capturing unit; and
controlling the display unit to display a remaining time before reaching the first predetermined set time before starting distributing an image captured by the image capturing unit to the distribution server via the communication unit.

18. A non-transitory computer-readable storage medium storing program which, when read and executed by a computer, causes the computer to perform the steps of a control method of an image capturing apparatus including an image capturing unit, a display unit, and a communication unit for communicating with a distribution server via internet, the method comprising:
measuring, if a distribution instruction for live distribution using the distribution server has been given before starting distributing an image captured by the image capturing unit to the distribution server via the communication unit, an elapsed time since the distribution instruction has been given before starting distributing an image captured by the image capturing unit to the distribution server via the communication unit;
controlling to start, if the elapsed time measured by the time measuring processing has reached a predetermined set time, distributing an image captured by the image capturing unit to the distribution server via the communication unit;
measuring, if a shooting instruction for shooting a still image has been given, an elapsed time since the shooting instruction has been given;
controlling to start, if the elapsed time measured by the second time measuring processing has reached a second predetermined set time, capturing a still mage by the image capturing unit; and
controlling to display a remaining time before reaching the predetermined set time before starting distributing an image captured by the image capturing unit to the distribution server via the communication unit.

* * * * *